(12) United States Patent
Kobayashi et al.

(10) Patent No.: US 7,646,822 B2
(45) Date of Patent: Jan. 12, 2010

(54) ANTENNA SELECTIVE DIVERSITY

(75) Inventors: Kiyotaka Kobayashi, Ota-ku (JP);
Yutaka Murakami, Yokohama (JP);
Masayuki Orihashi, Funabashi (JP);
Akihiko Matsuoka, Yokohama (JP)

(73) Assignee: Panasonic Corporation, Osaka (JP)

( * ) Notice: Subject to any disclaimer, the term of this patent is extended or adjusted under 35 U.S.C. 154(b) by 601 days.

(21) Appl. No.: 10/570,790

(22) PCT Filed: Sep. 9, 2004

(86) PCT No.: PCT/JP2004/013171

§ 371 (c)(1),
(2), (4) Date: Mar. 6, 2006

(87) PCT Pub. No.: WO2005/027372

PCT Pub. Date: Mar. 24, 2005

(65) Prior Publication Data

US 2007/0030918 A1 Feb. 8, 2007

(30) Foreign Application Priority Data

Sep. 10, 2003 (JP) ............................. 2003-318809
Sep. 6, 2004 (JP) ............................. 2004-258919

(51) Int. Cl.
*H04B 7/02* (2006.01)
*H04L 1/02* (2006.01)
(52) U.S. Cl. ..................................... 375/267; 340/5.64
(58) Field of Classification Search ................. 375/267; 340/5.64
See application file for complete search history.

(56) References Cited

U.S. PATENT DOCUMENTS 7,149,253 B2 * 12/2006 Hosur ........................ 375/267
7,269,224 B2 * 9/2007 Stuber et al. ................ 375/260

(Continued)

FOREIGN PATENT DOCUMENTS

JP 923212 1/1997

(Continued)

OTHER PUBLICATIONS

English Translation of International Preliminary Report on Patentability Chapter I, Jun. 26, 2006.*

(Continued)

*Primary Examiner*—Mohammad H Ghayour
*Assistant Examiner*—Nader Bolourchi
(74) *Attorney, Agent, or Firm*—Dickinson Wright PLLC

(57) ABSTRACT

A transmitting apparatus that transmits signals from a plurality of antennas, and can improve the security of communication compared with a conventional system. In this apparatus, an antenna changing section (105) stores an antenna change pattern in internal memory, and each time a clock signal is input, generates an antenna change signal directing an antenna change in accordance with the antenna change pattern, and outputs this signal to an antenna selection section (106). Based on the antenna change signal, the antenna selection section (106) selects two different antennas from among the transmitting antennas (107-1 through 107-3) as transmitting antennas of transmit signal A output from a radio section (104-1) and transmit signal B output from a radio section (104-2), and performs radio transmission of transmit signal A and transmit signal B using the selected transmitting antennas.

8 Claims, 19 Drawing Sheets

U.S. PATENT DOCUMENTS

2003/0206601 A1* 11/2003 Shiu .......................... 375/267

FOREIGN PATENT DOCUMENTS

WO      0105061     *  1/2001

OTHER PUBLICATIONS

English Translation of the Written Opinion of the International Search Authority, Jun. 22, 2006.*

International Preliminary Report on Patentability Chapter I, Mar. 13, 2006.*

Written Opinion of the International Search Authority, Mar. 10, 2006.*

Initial Publication with ISR (A1 Dec. 2005); Mar. 24, 2005.*

M. Horike, et al.; "Rikujo Ido Tsushinro no Fukisoku Hendo ni Motozuku Himitsu Kagi Kyoyu Hoshiki," The Institute of Electronics, Information and Communication Engineers, Gijutsu Kenkyu Hokoku, vol. 102, No. 374, The Institute of Electronics, Information and Communication Engineers, Oct. 11, 2002, RCS2002-173.

* cited by examiner

US 7,646,822 B2

ANTENNA SELECTIVE DIVERSITY

This is a national phase application of PCT International application PCT/JP2004/013171 filed Sep. 9, 2004, which is based on Japanese application number 2003-318809, filed Sep. 10, 2003, and Japanese application number 2004-258919, filed Sep. 6, 2004, the entire coments of each of which is incorporated by reference herein.

TECHNICAL FIELD

The present invention relates to a secure communication method that assures security between a transmitting apparatus and a receiving apparatus when performing radio communication, and a communication apparatus using that method.

BACKGROUND ART

The widespread use of mobile terminals and so forth in recent years has brought demands for improved security between a transmitting apparatus and receiving apparatus when performing radio communication. One example of a conventional secure communication method that assures security (Patent Literature 1) will be described using FIG. 1.

In FIG. 1, a transmitting apparatus 10 has a modulation section 11, a radio section 12, and a transmitting antenna 13. Modulation section 11 has a transmit digital signal as input, modulates this signal and generates a transmit baseband signal, and outputs this signal to radio section 12. Radio section 12 has the transmit baseband signal as input, up-converts this signal and generates a transmit signal, and transmits this signal from transmitting antenna 13 as a radio signal.

On the other hand, a receiving apparatus 50 has a receiving antenna 51, a transmitting antenna 52, a radio section 53, an interference wave generation section 54, an interference wave processing section 55, an adding section 56, and a demodulation section 57. Radio section 53 has a received signal received by receiving antenna 51 as input, down-converts this signal and generates a received baseband signal, and outputs this signal to adding section 56. Radio section 53 also has an interference wave signal generated by interference wave generation section 54 as input, up-converts this signal and generates a transmit interference wave signal, and transmits this signal from transmitting antenna 52 as a radio signal. As a result, a signal in which the transmit signal transmitted as a radio signal from transmitting antenna 13 and the transmit interference wave signal transmitted as a radio signal from transmitting antenna 52 are added together becomes the received signal received by receiving antenna 51.

Interference wave processing section 55 has an interference wave signal generated by interference wave generation section 54 as input, performs phase inversion processing and attenuation processing on this signal and generates a processed interference wave signal, and outputs this signal to adding section 56.

Adding section 56 has the received baseband signal and processed interference wave signal as input, and adds these signals together. By this means, the interference wave signal is eliminated from the received baseband signal, and an interference wave free signal is generated. Adding section 56 outputs the interference wave free signal to demodulation section 57. Demodulation section 57 has the interference wave free signal as input, demodulates this signal, and outputs a received digital signal.

Thus, with the conventional technology, secure communication is performed by having an interference wave generated by the receiving apparatus and eliminating the interference wave in the receiving apparatus.

Patent Literature 1: Unexamined Japanese Patent Publication No.2001-94536

DISCLOSURE OF INVENTION

Problems to be Solved by the Invention

However, in conventional secure communication, since a transmitting apparatus transmits a signal from one transmitting antenna, a radio wave can be physically received. Therefore, in conventional secure communication, the security of communication is limited.

It is an object of the present invention to provide a secure communication method, transmitting apparatus, and receiving apparatus that enable signals to be transmitted from a plurality of antennas and the security of communication to be improved compared with the conventional method.

Means for Solving the Problems

According to a secure communication method of the present invention, a transmitting apparatus equipped with a plurality of transmitting antennas performs radio transmission of a signal while switching the aforementioned transmitting antennas based on a predetermined antenna change pattern, and a receiving apparatus performs channel estimation and data demodulation on a signal transmitted as a radio signal from the aforementioned transmitting apparatus using the same change pattern as the aforementioned transmitting apparatus.

A secure communication method of the present invention has, in a transmitting apparatus that has a plurality of transmitting antennas, a step of inserting a channel estimation symbol in digital data and generating a transmit digital signal, a step of up-converting the aforementioned transmit digital signal and generating a transmit signal, a step of selecting antennas in accordance with a predetermined antenna change pattern, and a step of performing radio transmission of the aforementioned plurality of transmit signals using the selected antennas; and has, in a receiving apparatus that stores the same antenna change pattern as the aforementioned transmitting apparatus, a step of down-converting a signal received from the aforementioned transmitting apparatus and generating a received digital signal, a step of separating a data symbol and channel estimation symbol from the aforementioned received digital signal in synchronization with the timing at which the aforementioned transmitting apparatus switches the transmitting antennas, a step of performing channel estimation using the aforementioned separated channel estimation symbol based on the aforementioned antenna change pattern, and a step of demodulating the aforementioned data symbol based on a channel estimate.

According to a secure communication method of the present invention, a transmitting apparatus equipped with a plurality of transmitting antennas performs radio transmission of a transmit signal based on a predetermined signal arrangement pattern, and a receiving apparatus performs data demodulation on a signal transmitted as a radio signal from the aforementioned transmitting apparatus using the same signal arrangement pattern as the aforementioned transmitting apparatus.

A transmitting apparatus of the present invention has a configuration comprising a plurality of antennas, a frame configuration section that inserts a channel estimation symbol in digital data and generates a plurality of transmit digital signals, a radio section that up-converts the aforementioned transmit digital signals and generates transmit signals, an antenna changing section that directs an antenna change in accordance with an antenna change pattern common to the communicating receiving apparatus, and an antenna selection section that performs radio transmission of the aforementioned transmit signals using transmitting antennas selected in accordance with a directive of the aforementioned antenna change section.

A transmitting apparatus of the present invention has a configuration comprising a plurality of antennas, a signal generation section that generates a plurality of transmit signals from digital data, a pilot signal generation section that generates a pilot signal, a signal forming section that arranges the aforementioned plurality of transmit signals in accordance with a predetermined signal arrangement pattern and inserts the aforementioned pilot signal, a signal arranging section that directs the aforementioned signal forming section to perform signal arrangement in accordance with a signal arrangement pattern common to the communicating receiving apparatus, and a radio section that up-converts a signal arranged by the aforementioned signal forming section and generates a transmit signal.

A receiving apparatus of the present invention has a configuration comprising a radio section that receives and down-converts a signal transmitted from the aforementioned transmitting apparatus and generates a received digital signal, a separation section that separates a data symbol and channel estimation symbol from the aforementioned received digital signal in synchronization with the timing at which the aforementioned transmitting apparatus switches the transmitting antennas, a channel estimation section that performs channel estimation using the aforementioned separated channel estimation symbol based on an antenna change pattern common to the aforementioned transmitting apparatus, and a signal processing section that demodulates the aforementioned data symbol based on a channel estimate.

A receiving apparatus of the present invention has a configuration comprising a radio section that receives and down-converts a signal transmitted from the aforementioned transmitting apparatus and generates a received baseband signal, a channel estimation section that performs channel estimation using the aforementioned separated channel estimation symbol based on a signal arrangement pattern common to the aforementioned transmitting apparatus in synchronization with the timing at which the aforementioned transmitting apparatus switches the signal arrangement pattern, and a signal processing section that demodulates the aforementioned data symbol based on a signal arrangement pattern common to the aforementioned transmitting apparatus and a channel estimate.

EFFECTS OF THE INVENTION

According to the present invention, the propagation path of a transmit signal can be switched by having a transmitting apparatus switch the transmitting antenna based on a predetermined pattern. On the other hand, a receiving apparatus can demodulate a received signal by performing channel estimation using the same pattern as the transmitting apparatus. As a result, even if a radio wave is intercepted by a third party prior to transmitting antenna switching, performing transmitting antenna switching enables subsequent radio wave interception to be prevented and communication security to be improved.

MODES FOR CARRYING OUT THE INVENTION

Embodiments of the present invention will now be described in detail with reference to the accompanying drawings.

EMBODIMENT 1

In Embodiment 1, a case is described in which a transmitting apparatus that has three antennas switches the transmitting antennas when transmitting two kinds of signal, and a receiving apparatus that has two receiving antennas separates and demodulates received signals from a plurality of channels. In this embodiment, OFDM (Orthogonal Frequency Division Multiplexing) is used as an example of a multicarrier method.

Figure 2:
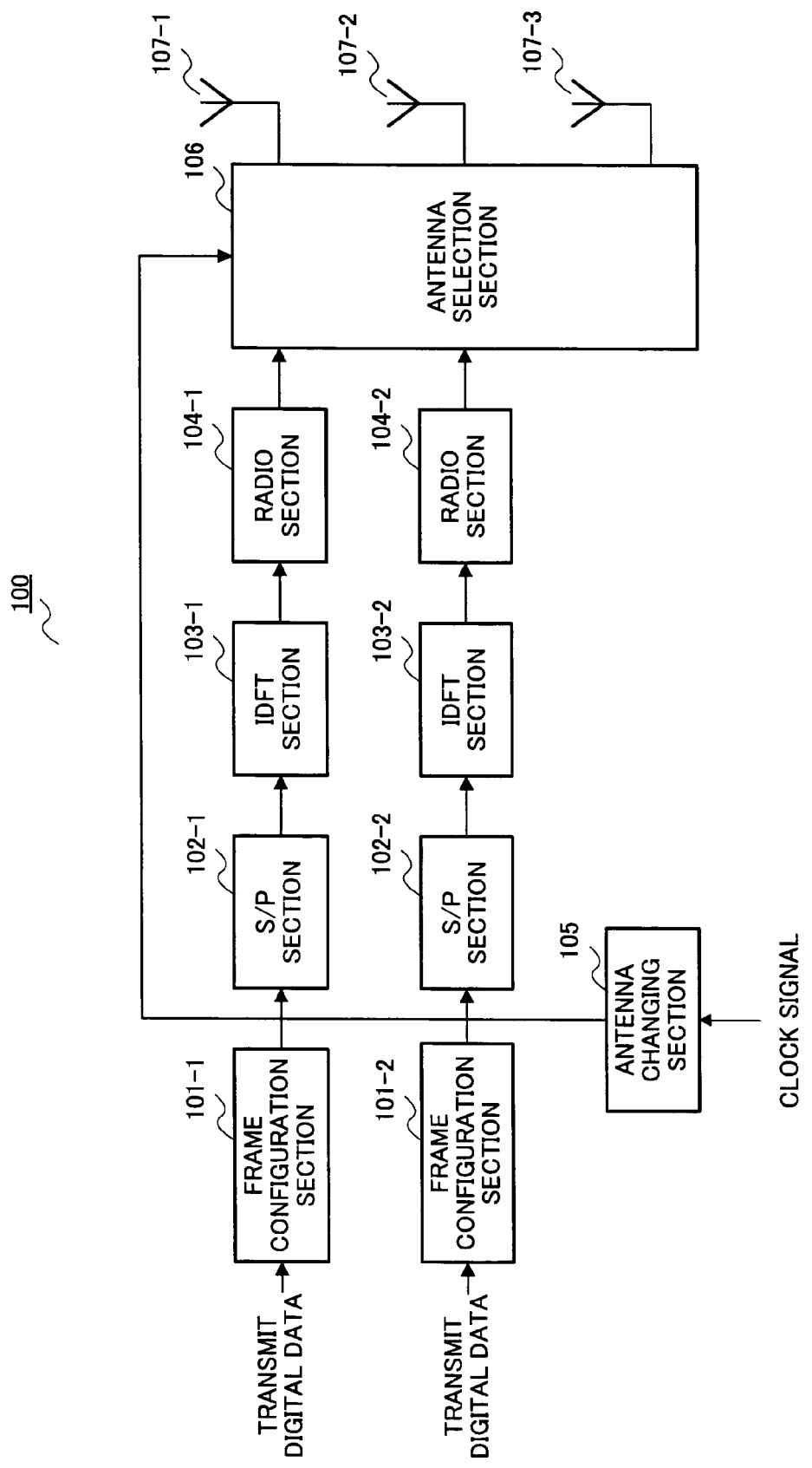
FIG. 2 is a block diagram showing an example of the configuration of a transmitting apparatus according to Embodiment 1 of the present invention.

First, an example of the configuration of a transmitting apparatus according to this embodiment will be described using the block diagram in FIG. 2. In FIG. 2, a transmitting apparatus 100 has frame configuration sections 101-1 and 101-2, S/P sections 102-1 and 102-2, IDFT sections 103-1 and 103-2, radio sections 104-1 and 104-2, an antenna changing section 105, an antenna selection section 106, and transmitting antennas 107-1 through 107-3.

Frame configuration sections 101-1 and 101-2 have transmit digital data as input, insert channel estimation symbols and guard symbols in the transmit digital data and generate transmit digital signals, and output these signals to S/P sections 102-1 and 102-2.

A channel estimation symbol is a symbol for estimating time synchronization, frequency synchronization, and distortion due to the transmission path, that corresponds to a known symbol such as a pilot symbol, unique word, or preamble, and for which a BPSK (Binary Phase Shift Keying) modulated signal is suitable. A null symbol is usually inserted as a guard symbol.

S/P section 102-1 has a transmit digital signal as input, performs serial/parallel conversion processing, and outputs the resulting signal to IDFT section 103-1. S/P section 102-2 has a transmit digital signal as input, performs serial/parallel conversion processing, and outputs the resulting signal to IDFT section 103-2.

IDFT section 103-1 has a transmit digital signal converted to parallel form as input, performs IDFT conversion processing and generates a transmit baseband signal, and outputs this signal to radio section 104-1. IDFT section 103-2 has a transmit digital signal converted to parallel form as input, performs IDFT conversion processing and generates a transmit baseband signal, and outputs this signal to radio section 104-2. IFFT(Inverse Fast Fourier Transform) processing is generally used as IDFT conversion processing.

Radio section 104-1 has a transmit baseband signal as input, up-converts this signal and generates a transmit signal (hereinafter referred to as "transmit signal A"), and outputs this signal to antenna selection section 106. Radio section 104-2 has a transmit baseband signal as input, up-converts this signal and generates a transmit signal (hereinafter referred to as "transmit signal B"), and outputs this signal to antenna selection section 106.

Antenna changing section 105 stores an antenna change pattern in internal memory, and each time a clock signal is input, generates an antenna change signal directing an antenna change in accordance with the antenna change pattern, and outputs this signal to antenna selection section 106.

Based on the antenna change signal, antenna selection section 106 selects two different antennas from among transmitting antennas 107-1 through 107-3 as transmit signal A and transmit signal B transmitting antennas, and performs radio transmission of transmit signal A and transmit signal B using the selected transmitting antennas.

This concludes the description of a sample configuration of a transmitting apparatus according to this embodiment.

Figure 3:
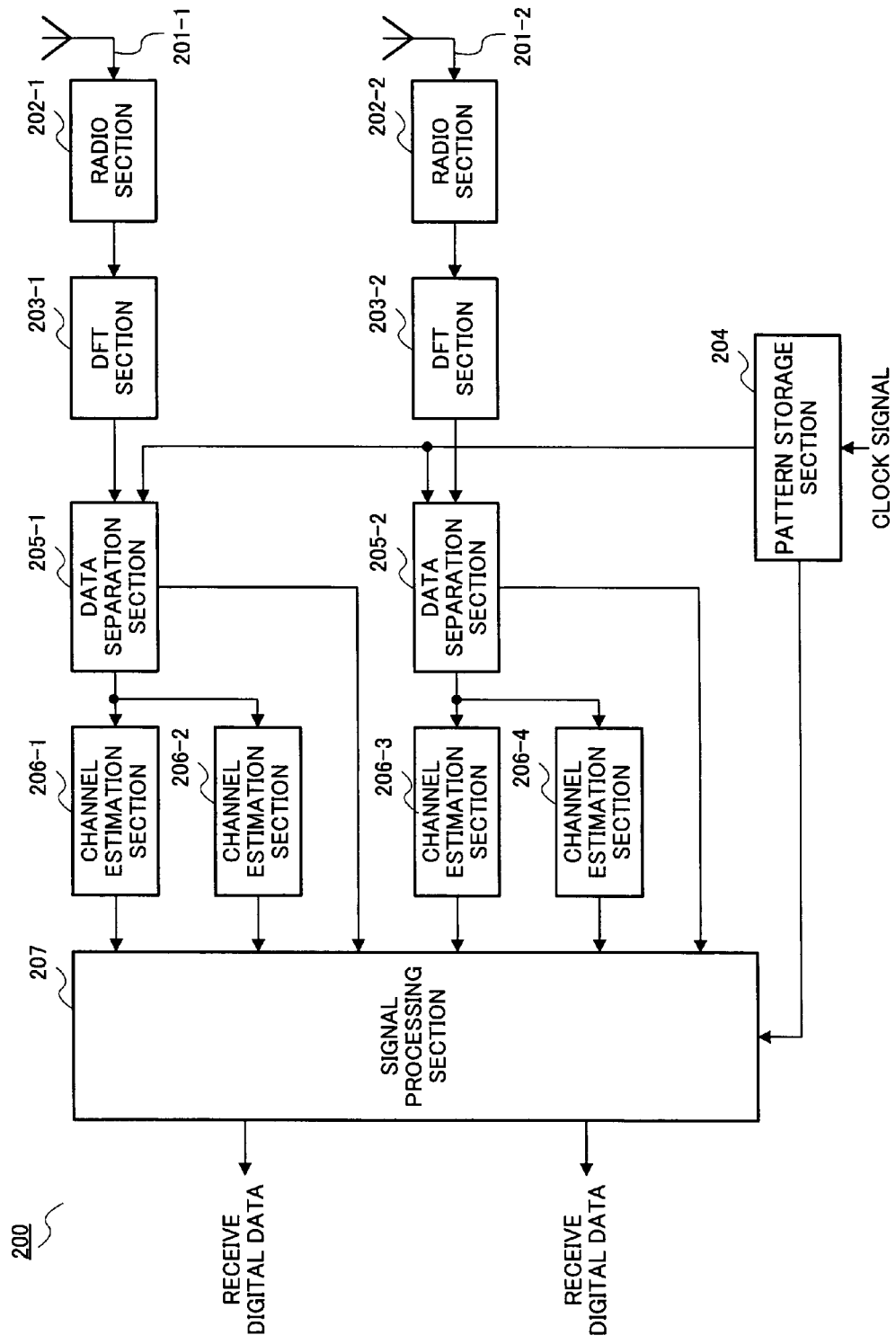
FIG. 3 is a block diagram showing an example of the configuration of a receiving apparatus according to the above embodiment.

Next, an example of the configuration of a receiving apparatus according to this embodiment that performs radio communication with the transmitting apparatus shown in FIG. 2 will be described using the block diagram in FIG. 3. In FIG. 3, a receiving apparatus 200 has receiving antennas 201-1 and 201-2, radio sections 202-1 and 202-2, DFT sections 203-1 and 203-2, a pattern storage section 204, data separation sections 205-1 and 205-2, channel estimation sections 206-1 through 206-4, and a signal processing section 207.

Radio section 202-1 has a received signal received by receiving antenna 201-1 as input, down-converts this signal and generates a received baseband signal, and outputs this signal to DFT section 203-1. Radio section 202-2 has a received signal received by receiving antenna 201-2 as input, down-converts this signal and generates a received baseband signal, and outputs this signal to DFT section 203-2.

DFT section 203-1 has a received baseband signal as input, performs DFT conversion processing on this signal, and outputs the resulting signal to data separation section 205-1. DFT section 203-2 has a received baseband signal as input, performs DFT conversion processing on this signal, and outputs the resulting signal to data separation section 205-2. FFT (Fast Fourier Transform) processing is generally used as DFT conversion processing.

Pattern storage section 204 stores the same antenna change pattern in internal memory as that stored by antenna changing section 105 shown in FIG. 2, and each time a clock signal is input, generates a transmit pattern information signal indicating the transmitting antennas in accordance with the antenna change pattern, and outputs this signal to data separation sections 205-1 and 205-2 and signal processing section 207.

Based on the transmit pattern information signal, data separation section 205-1 separates a received baseband signal that has undergone DFT conversion processing into a transmit signal A channel estimation symbol, a transmit signal B channel estimation symbol, and a data symbol, outputs the transmit signal A channel estimation symbol to channel estimation section 206-1, outputs the transmit signal B channel estimation symbol to channel estimation section 206-2, and outputs the data symbol to signal processing section 207. Based on the transmit pattern information signal, data separation section 205-2 separates a received baseband signal that has undergone DFT conversion processing into a transmit signal A channel estimation symbol, a transmit signal B channel estimation symbol, and a data symbol, outputs the transmit signal A channel estimation symbol to channel estimation section 206-3, outputs the transmit signal B channel estimation symbol to channel estimation section 206-4, and outputs the data symbol to signal processing section 207.

Channel estimation section 206-1 has the transmit signal A channel estimation symbol received by receiving antenna 201-1 as input, performs transmit signal A time synchronization, frequency synchronization, and transmission path distortion estimation processing (hereinafter referred to as "channel estimation"), and outputs a channel estimate indicating the processing result to signal processing section 207. Channel estimation section 206-2 has the transmit signal B channel estimation symbol received by receiving antenna 201-1 as input, performs transmit signal B channel estimation, and outputs a channel estimate to signal processing section 207.

Channel estimation section 206-3 has the transmit signal A channel estimation symbol received by receiving antenna 201-2 as input, performs transmit signal A channel estimation, and outputs a channel estimate to signal processing section 207. Channel estimation section 206-4 has the transmit signal B channel estimation symbol received by receiving antenna 201-2 as input, performs transmit signal B channel estimation, and outputs a channel estimate to signal processing section 207.

Signal processing section 207 demodulates data symbols using the channel estimates and transmit pattern information signal, and generates receive digital data. Examples of the modulation method include a method whereby inverse matrix computation is performed on a matrix comprising data symbols using a channel matrix comprising channel estimates, or a method in which MLD (Maximum Likelihood Detection) is performed.

This concludes the description of a sample configuration of a receiving apparatus according to this embodiment.

Figure 4:
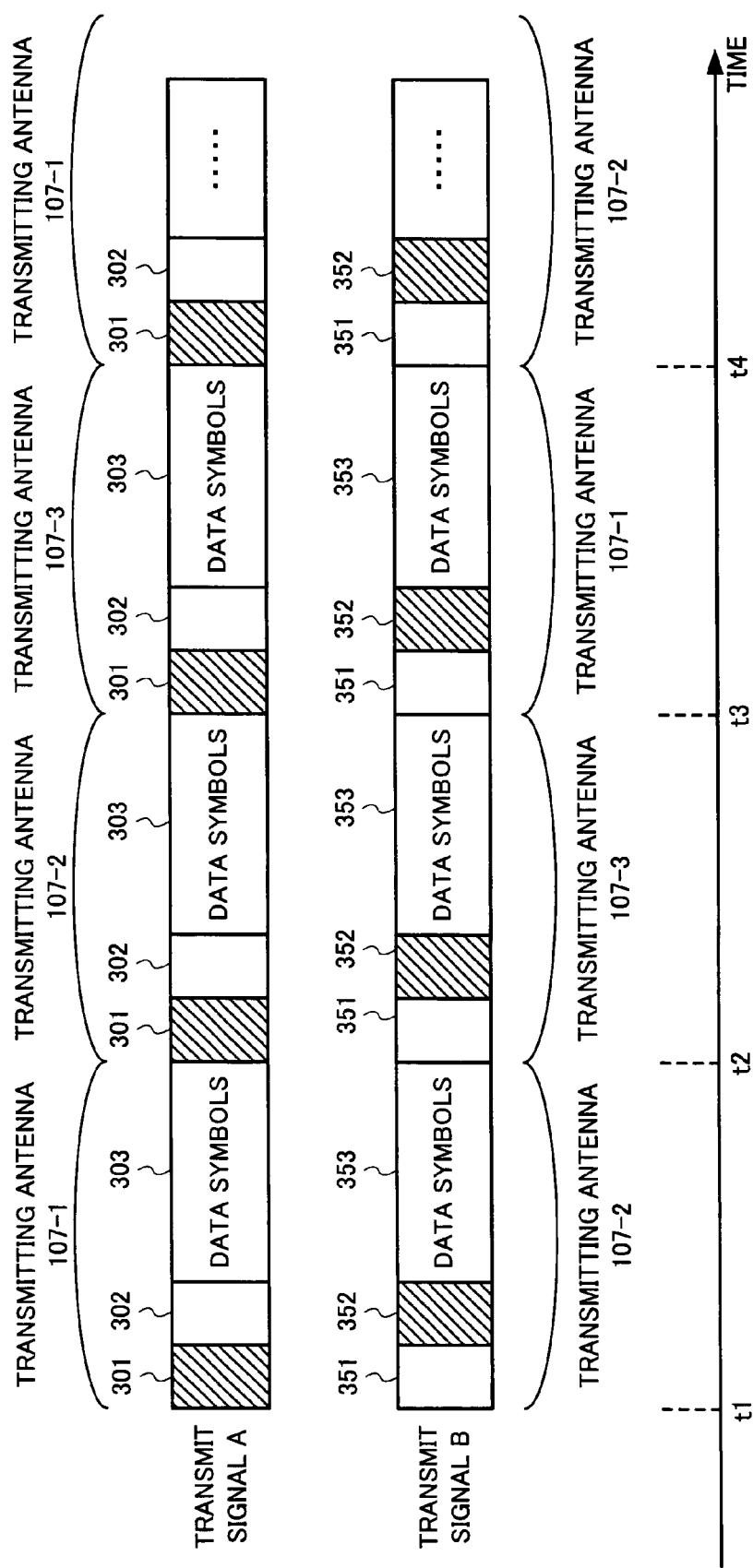
FIG. 4 is a drawing showing an example of frame configurations of transmit signals according to the above embodiment.
Figure 5:
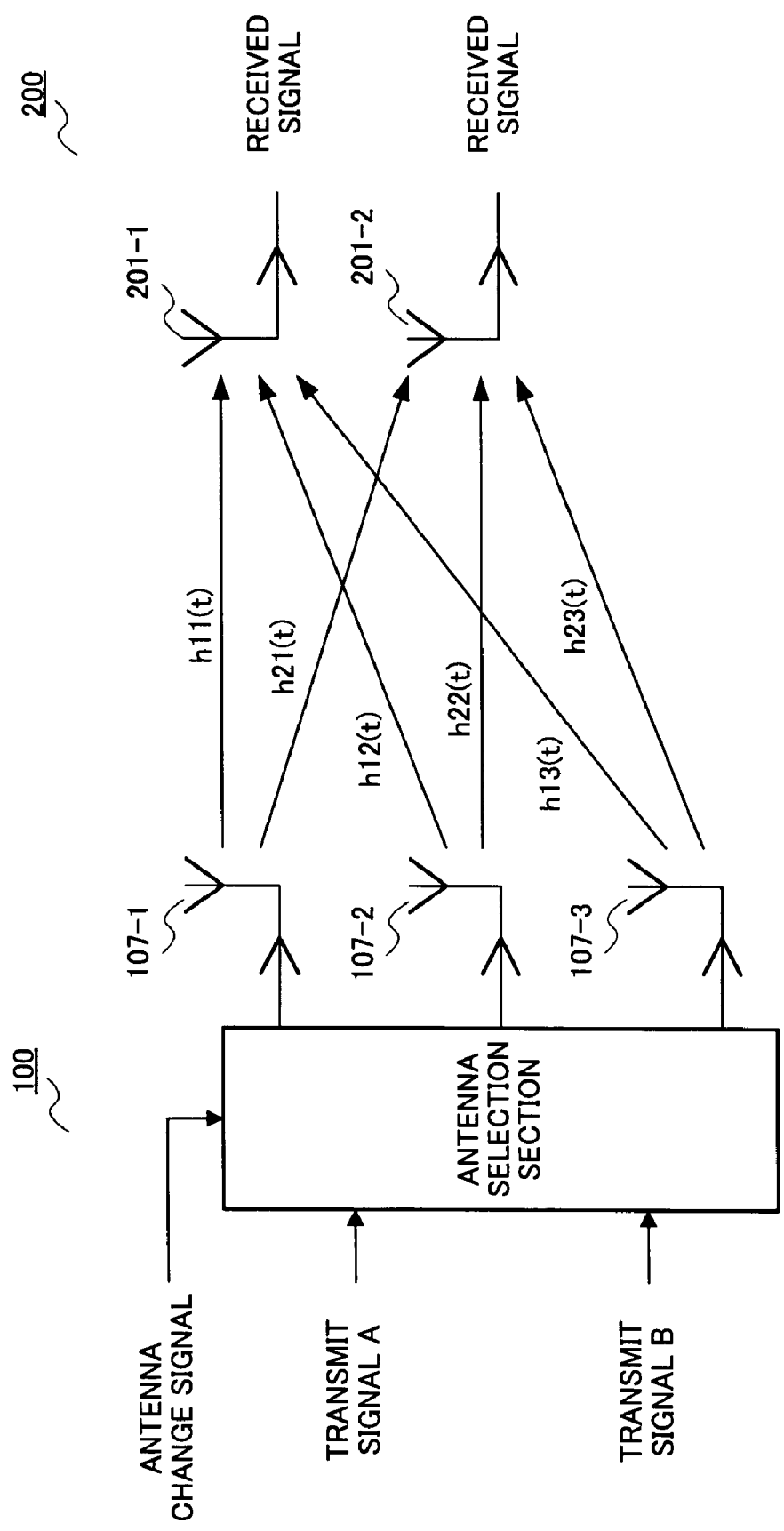
FIG. 5 is a drawing showing propagation channels between a transmitting apparatus and receiving apparatus according to the above embodiment.

A secure communication method according to this embodiment will now be described using above FIG. 2 and FIG. 3, and also FIG. 4 and FIG. 5. FIG. 4 is a drawing showing an example of frame configurations of transmit signals generated in a transmitting apparatus according to this embodiment. FIG. 5 is a drawing showing propagation channels between a transmitting apparatus and receiving apparatus according to this embodiment.

In FIG. 4, a transmit signal A frame is composed of a channel estimation symbol 301, guard symbol 302, and data symbols 303 in that order, while a transmit signal B frame is composed of a guard symbol 351, channel estimation symbol 352, and data symbols 353 in that order. The start of frame timing is the same for transmit signal A and transmit signal B, and guard symbols 302 and 351 are inserted so that transmit signal A channel estimation symbol 301 and transmit signal B channel estimation symbol 352 do not overlap time-wise. As a result, channel estimation symbols 301 and 352 are independent time-wise.

The antennas that transmit transmit signal A and transmit signal B are switched on a frame-by-frame basis in accordance with the antenna change pattern stored in antenna changing section 105. For example, for the frame transmitted between time t1 and time t2, transmit signal A is transmitted from transmitting antenna 107-1, and transmit signal B is transmitted from transmitting antenna 107-2. Then receiving antenna 201-1 receives a signal combining transmit signal A subjected to channel fluctuation h11(t) and transmit signal B subjected to channel fluctuation h12 (t), and receiving antenna 201-2 receives a signal combining transmit signal A subjected to channel fluctuation h21(t) and transmit signal B subjected to channel fluctuation h22(t).

Also, for the frame transmitted between time t2 and time t3, transmit signal A is transmitted from transmitting antenna 107-2, and transmit signal B is transmitted from transmitting antenna 107-3. Then receiving antenna 201-1 receives a signal combining transmit signal A subjected to channel fluctuation h12(t) and transmit signal B subjected to channel fluctuation h13(t), and receiving antenna 201-2 receives a signal combining transmit signal A subjected to channel fluctuation h22(t) and transmit signal B subjected to channel fluctuation h23(t).

Thereafter, the antennas transmitting the signals are switched in the same way on a frame-by-frame basis.

Receiving apparatus 200 performs channel estimation using channel estimation symbols in channel estimation sections 206-1 through 206-4. Here, the antenna change pattern of the transmitting apparatus is also known by the receiving apparatus at the start of transmission, and channel estimation sections 206-1 through 206-4 perform channel estimation anew synchronized with the timing at which the channels on which the transmit signals are propagated are switched by using a transmit pattern information signal identical to the antenna change signal in transmitting apparatus 100.

In channel estimation sections 206-1 through 206-4, channel estimation can be performed speedily by using channel estimates estimated in the past for channels after the antennas are switched.

Also, in channel estimation sections 206-1 through 206-4, when a channel estimation symbol is input, the other transmit signal is a guard symbol, and therefore high-quality channel estimation can be performed with little interference.

On the other hand, in order to intercept signals transmitted from transmitting apparatus 100, a third party must perform channel estimation anew each time transmitting antenna switching is carried out since the propagation channels vary as a result of transmitting antenna switching. However, since information indicating transmitting antenna switching is not contained in transmit signal frames, a third party has no means of knowing the antenna switching timing or transmit signal propagation channels. Therefore, a third party cannot intercept signals transmitted from transmitting apparatus 100.

Thus, in this embodiment, secure communication is implemented by having a transmitting apparatus that has a plurality of transmitting antennas transmit signals while switching the transmitting antennas based on a predetermined pattern, and having a receiving apparatus perform channel estimation using the same pattern as the transmitting apparatus, synchronized with the timing at which the transmitting antennas of the transmitting apparatus are switched.

In this embodiment, a case has been described by way of example in which the number of transmitting antennas is three and the number of receiving antennas is two, but the present invention is not limited to this configuration, and may also be configured with three or more transmitting antennas and two or more receiving antennas.

In this embodiment, OFDM is used as an example of a multicarrier method, but the present invention is not limited to this, and can be similarly implemented with an OFDM method that uses a spread spectrum communication method (DS-CDMA (Direct Spread-Code Division Multiple Access), FH (Frequency Hopping)-CDMA, UWB (Ultra Wide Band), etc.), or a multicarrier method other than OFDM.

In this embodiment, a case has been described in which the transmitting antennas are switched on a frame-by-frame basis, but the present invention is not limited to this, and a security effect can also be obtained by switching the transmitting antennas at a rate of once per plurality of frames, or switching the transmitting antennas at random intervals.

In this embodiment, channel estimation symbols can be made symbols interpolated from past channel estimation symbols—that is, symbols that track channel fluctuations over time. For example, in FIG. 4, by using a configuration whereby a channel estimation symbol is also transmitted from transmitting antenna 107-3 in addition to data symbols being transmitted from transmitting antennas 107-1 and 107-2 in the period from time t1 to time t2, symbols that track channel fluctuations can be used from time t2 onward. As a result, since it is difficult to perform channel estimation with only one channel estimation symbol, it becomes more difficult for a third party to demodulate received signals, enabling security to be further improved.

In this embodiment, a case has been described in which channel estimation symbols and guard symbols are placed before data symbols, as shown in FIG. 4, but the present invention is not limited to this, and it is also possible to use a configuration in which channel estimation symbols and guard symbols are placed after data symbols, and data symbols before these symbols are demodulated, or a configuration in which channel estimation symbols and guard symbols are placed among data symbols, and data symbols before and after these symbols are demodulated.

EMBODIMENT 2

In the present invention, in the above transmitting apparatus configuration in FIG. 2 and receiving apparatus configuration in FIG. 3, configurations can be used whereby the antenna that transmits transmit signal A (107-1) is fixed, and only the antennas that transmit transmit signal B (107-2 and 107-3) are switched.

To compare this case with the frame configurations in FIG. 4, although security falls inasmuch as the transmit signal A propagation channel is not switched, an advantage is that transmission/reception processing is simplified.

EMBODIMENT 3

Figure 7:
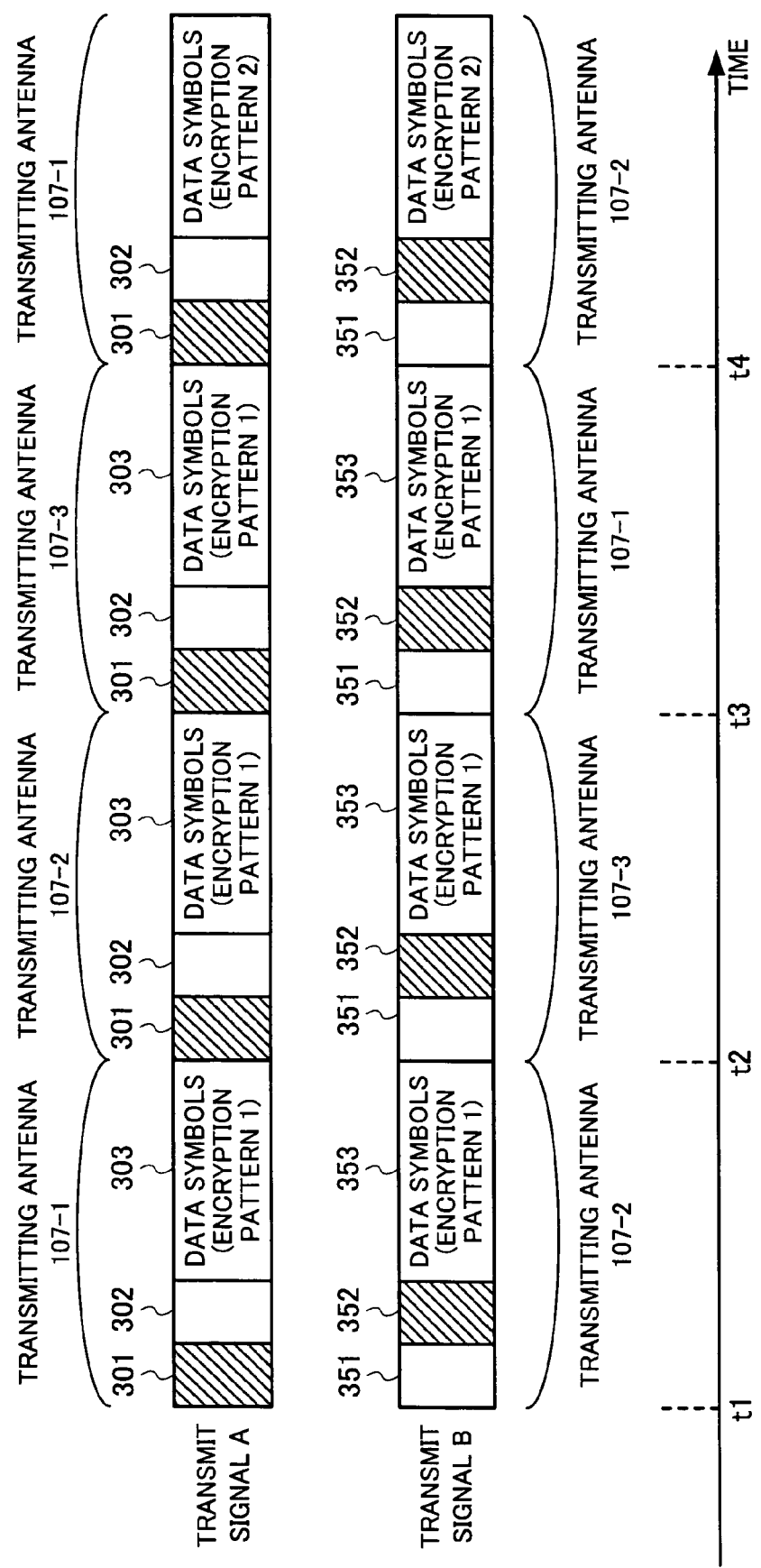
FIG. 7 is a drawing showing an example of frame configurations of transmit signals according to Embodiment 3 of the present invention.

In the present invention, with the above transmitting apparatus configuration in FIG. 2 and receiving apparatus configuration in FIG. 3, the digital signal encryption pattern can also be changed every antenna switching cycle (the period until the antenna switching pattern completes a cycle and returns to its original form), as shown in FIG. 7. FIG. 7 shows a case in which the period from time t1 to time t4 is an antenna switching cycle, with encryption pattern 1 being used for data symbols transmitted between time t1 and time t4, and encryption pattern 2 being used for data symbols transmitted from time t4 onward. Possible data symbol encryption pattern changes include cases in which the pattern of interleaving or scrambling data is changed, the error correction code (Reed-Solomon code, convolutional code, turbo code, LDPC (Low Density Parity Check) code, etc.) is changed, or the public key encryption method (RSA, etc.) or private key encryption method (DES, etc.) is changed. For example, even in a case where a signal is intercepted from time t1 to time t4, and it becomes unnecessary to perform channel estimation anew from time t1 onward because channel fluctuation is small from time t1 to time t4, enabling interception to be easily carried out in time t4, interception can be made difficult by transmitting with a different encryption pattern from time t4 onward, enabling security to be attained.

EMBODIMENT 4

Figure 8:
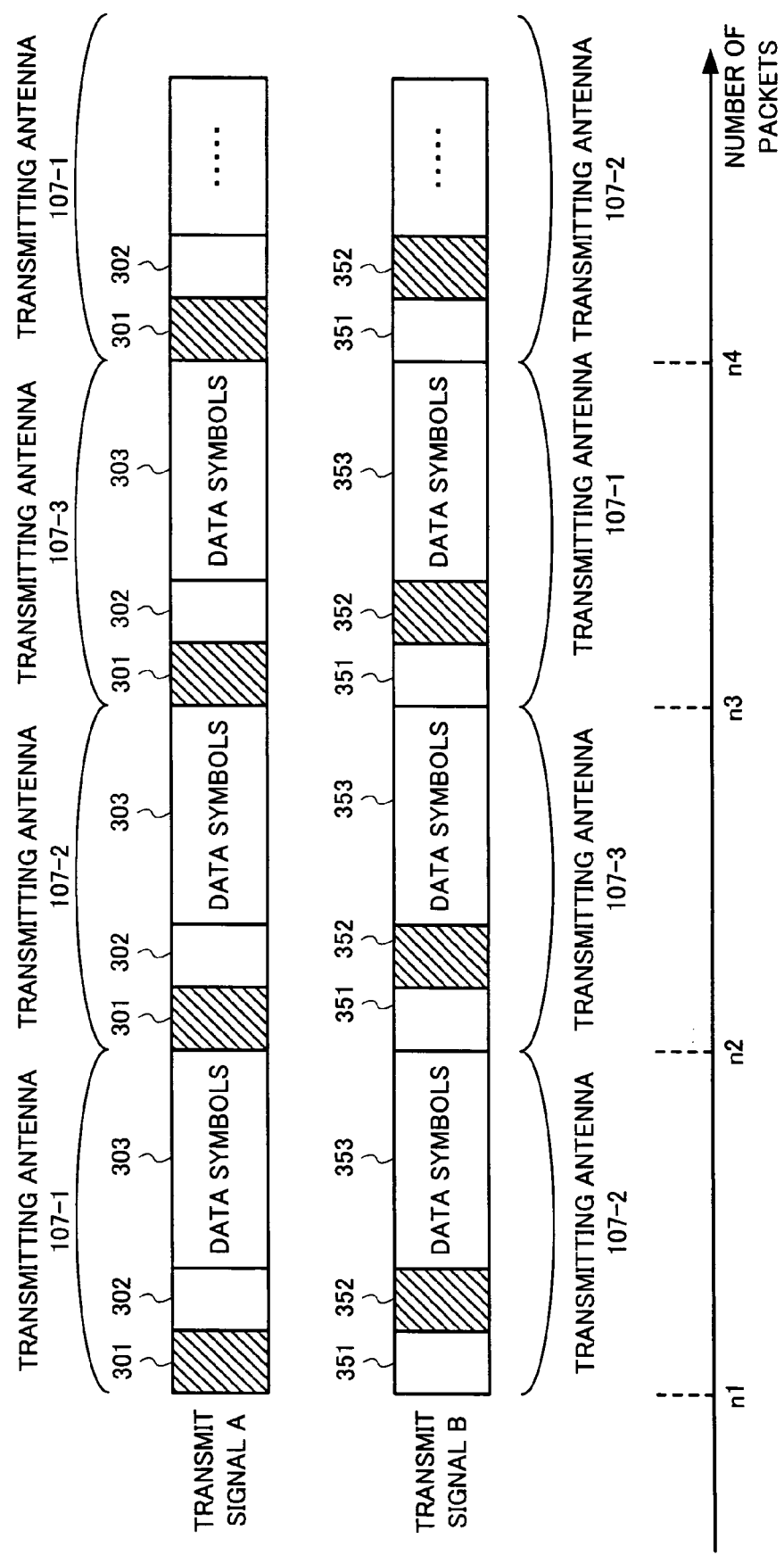
FIG. 8 is a drawing showing an example of frame configurations of transmit signals according to Embodiment 4 of the present invention.

In the present invention, with the above transmitting apparatus configuration in FIG. 2 and receiving apparatus configuration in FIG. 3, antenna switching can also be performed based on the number of transmit packets, as shown in FIG. 8. Furthermore, the configuration shown in FIG. 8 is possible with various parameters indicating quantity rather than time, such as the number of transmit data bits, or the number of transmissions of packets having priority with regard to packet assignment in transmission (such as the number of transmissions of packets that it is wished to transmit without fail in one go, without retransmitting). The transmitting antennas may also be switched at random intervals for the number of transmit packet bits, number of transmit packets, or number of packets having priority.

EMBODIMENT 5

In Embodiment 5, a method is described whereby secure communication is performed using a space-time block code.

Figure 9:
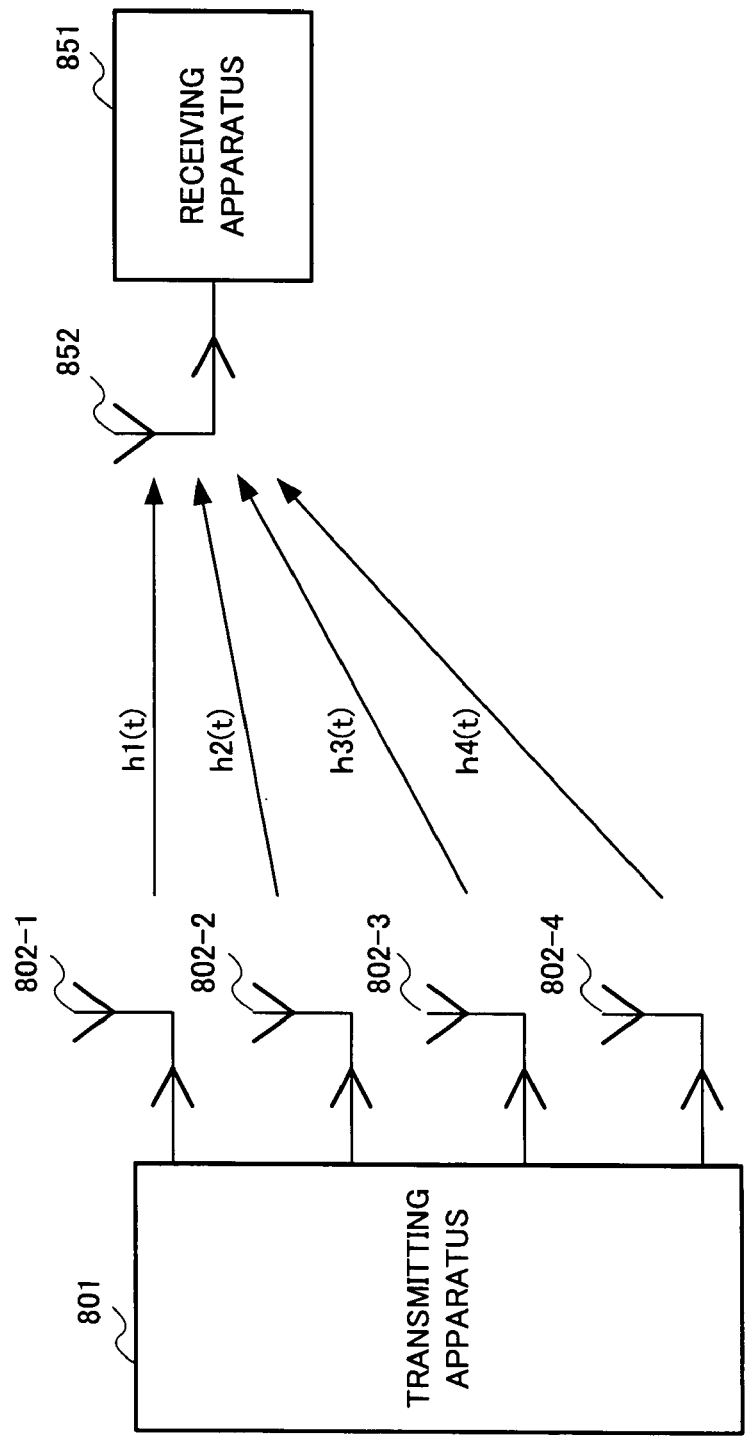
FIG. 9 is a drawing showing the overall configuration of a multi-antenna communication system of Embodiment 5 of the present invention.

FIG. 9 is a drawing showing the overall configuration of a multi-antenna communication system 800 according to this embodiment. In multi-antenna communication system 800, a transmitting apparatus 801 has four antennas 802-1 through 802-4, and signals are transmitted simultaneously from each of antennas 802-1 through 802-4. A receiving apparatus 851 receives signals simultaneously transmitted from antennas 802-1 through 802-4 by means of an antenna 852. A signal transmitted from antenna 802-1 is subjected to channel fluctuation h1(t) and is received by antenna 852, and similarly, signals transmitted from antennas 802-2, 802-3, and 802-4 are subjected to channel fluctuations h2(t), h3 (t) , and h4 (t) respectively and are received by antenna 852. In the following description, it is assumed that there is no propagation path (channel) time fluctuation within the time in which space-time block coded signals are received.

Figure 10:
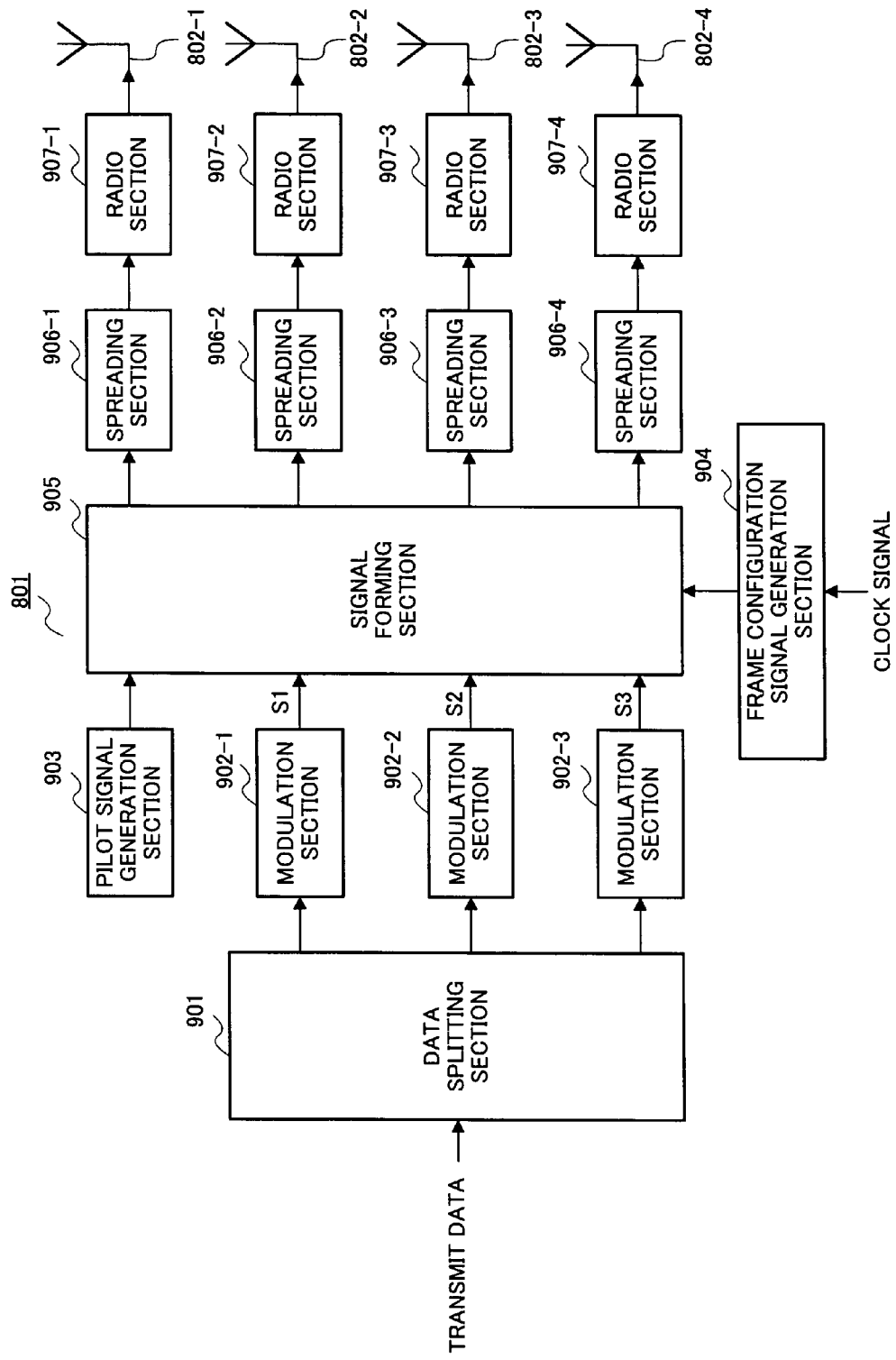
FIG. 10 is a block diagram showing the configuration of a transmitting apparatus according to the above embodiment.

FIG. 10 is a block diagram showing the configuration of a transmitting apparatus 801 according to this embodiment. In FIG. 10, transmitting apparatus 801 is mainly composed of a data splitting section 901, modulation sections 902-1 through 902-3, a pilot signal generation section 903, a frame configuration signal generation section 904, a signal forming section 905, spreading sections 906-1 through 906-4, radio sections 907-1 through 907-4, and antennas 802-1 through 802-4.

Data splitting section 901 splits transmit data, and outputs the split transmit data to modulation sections 902-1, 902-2, and 902-3.

Modulation section 902-1 executes digital modulation processing on the transmit data, and outputs an obtained transmit symbol S1 to signal forming section 905. In the case of QPSK, for example, one transmit symbol S1 is obtained from 2-bit transmit data. Similarly, modulation sections 902-2 and 902-3 execute digital modulation processing on their respective transmit data, and output an obtained transmit symbols S2 and S3 to signal forming section 905.

Pilot signal generation section 903 generates a pilot signal, and outputs this signal to signal forming section 905.

Frame configuration signal generation section 904 stores a signal arrangement pattern in internal memory, and each time a clock signal is input, generates a signal arrangement change signal directing a change of the signal arrangement in accordance with the signal arrangement pattern, and outputs this signal to signal forming section 905.

Signal forming section 905 forms space-time block coded signals using transmit symbols S1, S2, and S3, inserts a pilot signal periodically, and outputs the space-time block coded signals and pilot signal to spreading sections 906-1 through 906-4. Signal forming section 905 changes the signal arrangement pattern of the space-time block coded signals each time a signal arrangement change signal is input. A specific example of a space-time block coded signal is described later herein.

Spreading sections 906-1 through 906-4 multiply the respective space-time block coded signals by a spreading code and output the post-spreading signals to radio sections 907-1 through 907-4.

Radio sections 907-1 through 907-4 execute predetermined radio processing such as frequency conversion on the output signals of spreading sections 906-1 through 906-4, and supply the radio transmit signals thus obtained to antennas 802-1 through 802-4 respectively.

Figure 11:
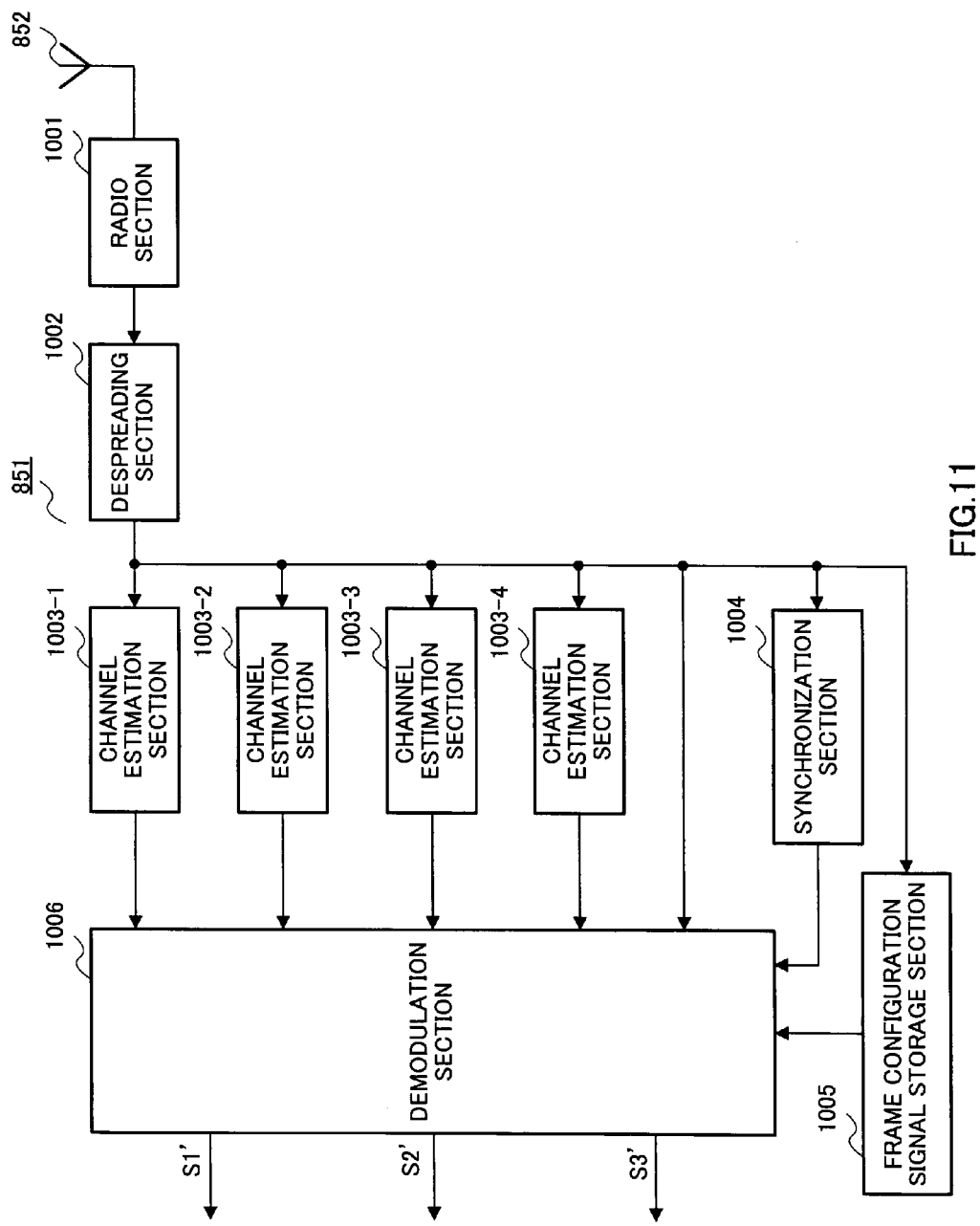
FIG. 11 is a block diagram showing the configuration of a receiving apparatus according to the above embodiment.

FIG. 11 is a block diagram showing the configuration of receiving apparatus 851 according to this embodiment. In FIG. 11, receiving apparatus 851 is mainly composed of antenna 852, a radio section 1001, a despreading section 1002, channel estimation sections 1003-1 through 1003-4, a synchronization section 1004, a frame configuration signal storage section 1005, and a demodulation section 1006, and receives space-time block coded signals transmitted from transmitting apparatus 801 in FIG. 9.

Radio section 1001 executes predetermined radio reception processing such as frequency conversion on the signals received by antenna 852, and outputs the received baseband signal thus obtained to despreading section 1002. Despreading section 1002 despreads the received baseband signal, and outputs the post-despreading received baseband signal to channel estimation sections 1003-1 through 1003-4, synchronization section 1004, frame configuration signal storage section 1005, and demodulation section 1006.

Channel estimation section 1003-1 finds channel fluctuation h1 between antenna 802-1 and antenna 852 based on the pilot symbol contained in the signal transmitted from antenna 802-1, and outputs this to demodulation section 1006. Similarly, channel estimation sections 1003-2, 1003-3, and 1003-4 find channel fluctuations h2, h3, and h4 respectively, and output these to demodulation section 1006.

Synchronization section 1004 synchronizes the signals transmitted from antennas 802-1, 802-2, 802-3, and 802-4 based on the pilot symbols contained in the received signals, and outputs a timing signal for modulation timing synchronization in the demodulation section to demodulation section 1006.

Frame configuration signal storage section 1005 stores in internal memory a signal arrangement pattern identical to that stored in frame configuration signal generation section 904 shown in transmitting apparatus 10, and each time a received baseband signal is input, generates a signal arrangement change signal directing a change of signal arrangement in accordance with the signal arrangement pattern, and outputs this signal to demodulation section 1006.

Demodulation section 1006 has channel fluctuations h1, h2, h3, and h4, received baseband signals (received baseband signals corresponding to times i, i+1, i+2, and i+3 on the transmitting side being defined as R(t), R(t+1), R(t+2), and R(t+3)), a timing signal, and a signal arrangement change signal as input, performs inverse matrix computation corresponding to the space-time block coded transmit signal matrix, for example, based on the signal arrangement change signal, finds demodulation transmit signals S1', S2', and S3', demodulates these S1', S2', and S3' signals, and outputs receive digital data.

Figure 12:
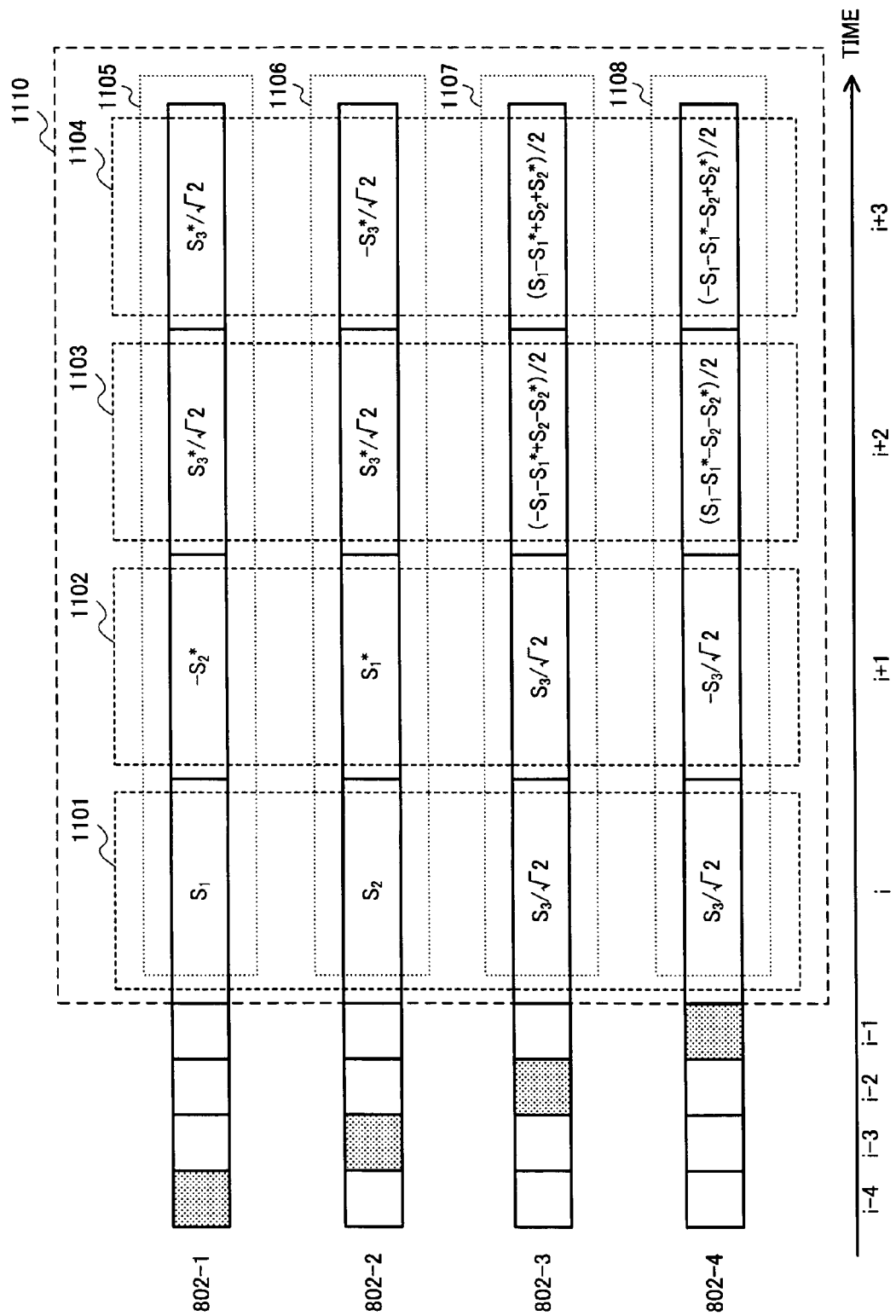
FIG. 12 is a drawing showing an example of a transmit frame configuration according to the above embodiment.

FIG. 12 is a drawing showing an example of a transmit frame configuration according to this embodiment. Shaded areas in the figure indicate pilot symbols, and unshaded areas indicate null symbols (no signal). Pilot symbols are transmitted from 802-1 at time i-4, from 802-2 at time i-3, from 802-3 at time i-2, and from 802-4 at time i-1.

Then, at times i through i+3, a transmit signal matrix 1110 comprising transmit signal column vectors 1101 through 1104 and transmit signal row vectors 1105 through 1108 is transmitted. The space-time block coding method shown in FIG. 12 is the method shown in "Space-Time Block Coding for Wireless Communications: Performance Results" IEEE JOURNAL ON SELECTED AREAS IN COMMUNICATIONS, pp 451-460, vol.17, no.3, March 1999. An asterisk (*) indicates a complex conjugate. Generally, when space-time block coding is executed, transmit signal column vectors (for example, time i transmit signal column vector 1101 and time i+1 transmit signal column vector 1102) have an orthogonal relationship, and maximal-ratio combining of transmit signals can be performed irrespective of channel fluctuation in signal separation on the receiving side, enabling large diversity gain to be obtained. As a result, reception quality improves. In addition to the above-described method, known methods of performing maximal-ratio combining on the receiving side include the use of a correlation matrix. In the present invention there are no restrictions on the maximal-ratio combining method.

At this time, transmit symbol S1, S2, and S3 demodulated transmit symbols S1', S2', and S3' are expressed by equations (1) through (3) below.

(Equation 1)

$$S'_1 = \left( R(t)h_1^* + R(t+1)^*h_2 + \frac{(R(t+3) - R(t+2))(h_3^* - h_4^*)}{2} - \frac{(R(t+2) + R(t+3))*(h_3 + h_4)}{2} \right) \quad (1)$$

-continued $$S'_2 = \left( R(t)h_2^* - R(t+1)^*h_1 + \frac{(R(t+3) + R(t+2))(h_3^* - h_4^*)}{2} - \frac{(-R(t+2) + R(t+3))*(h_3 + h_4)}{2} \right) \quad (2)$$

$$S'_3 = \left( \frac{(R(t) + R(t+1))h_3^*}{\sqrt{2}} \frac{(R(t) - R(t+1))h_4^*}{\sqrt{2}} + \frac{R(t+2)*(h_1 + h_2)}{\sqrt{2}} + \frac{R(t+3)*(h_1 - h_2)}{\sqrt{2}} \right) \quad (3)$$

Figure 13:
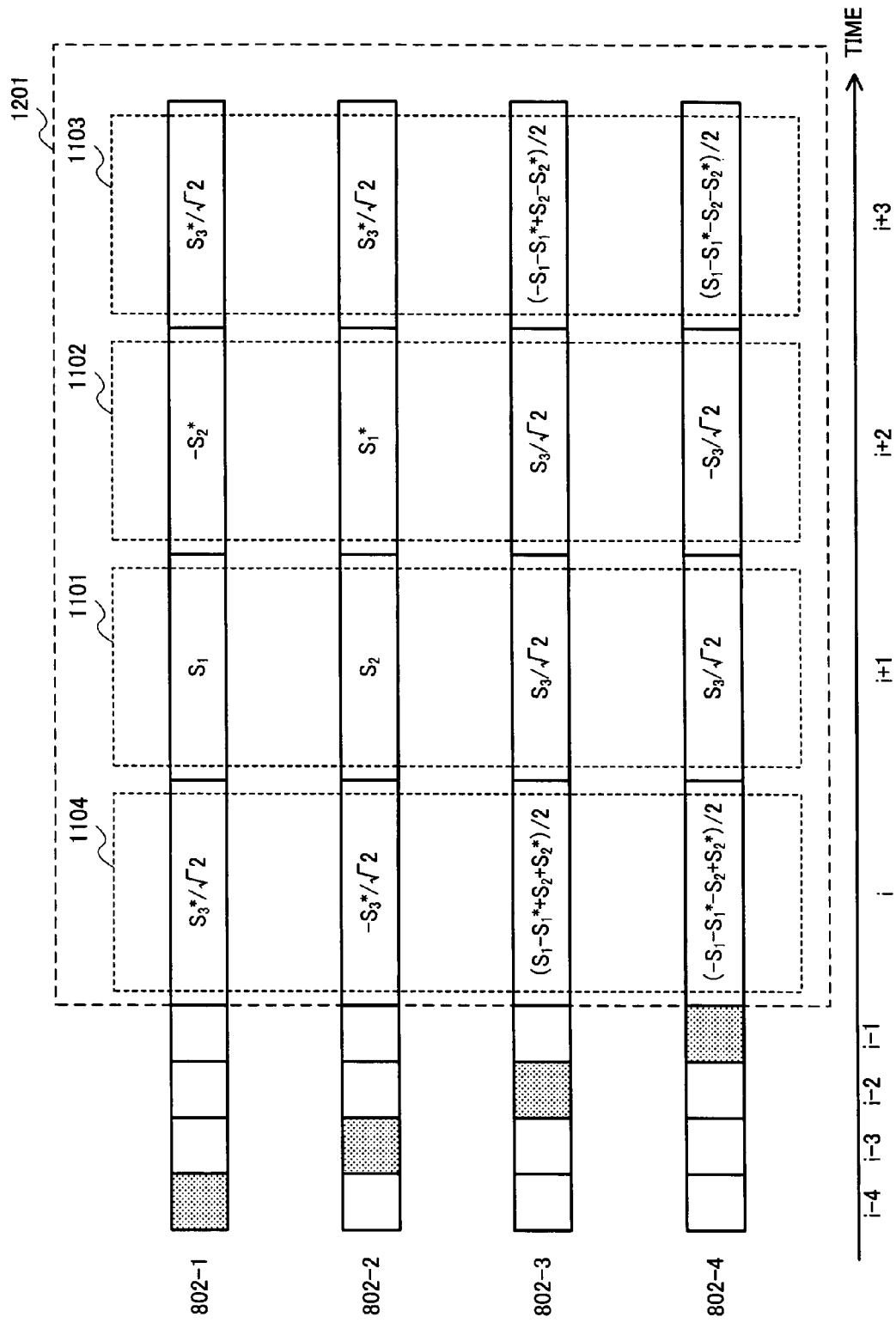
FIG. 13 is a drawing showing an example of a transmit frame configuration according to the above embodiment.

FIG. 13 is a drawing showing a transmit frame configuration when the transmit signal column vector transmission order is changed around with respect to the transmit frame configuration shown in FIG. 12, so that transmit signal column vector 1104 is transmitted at time i, transmit signal column vector 1101 is transmitted at time i+1, transmit signal column vector 1102 is transmitted at time i+2, and transmit signal column vector 1103 is transmitted at time i+3.

Figure 14:
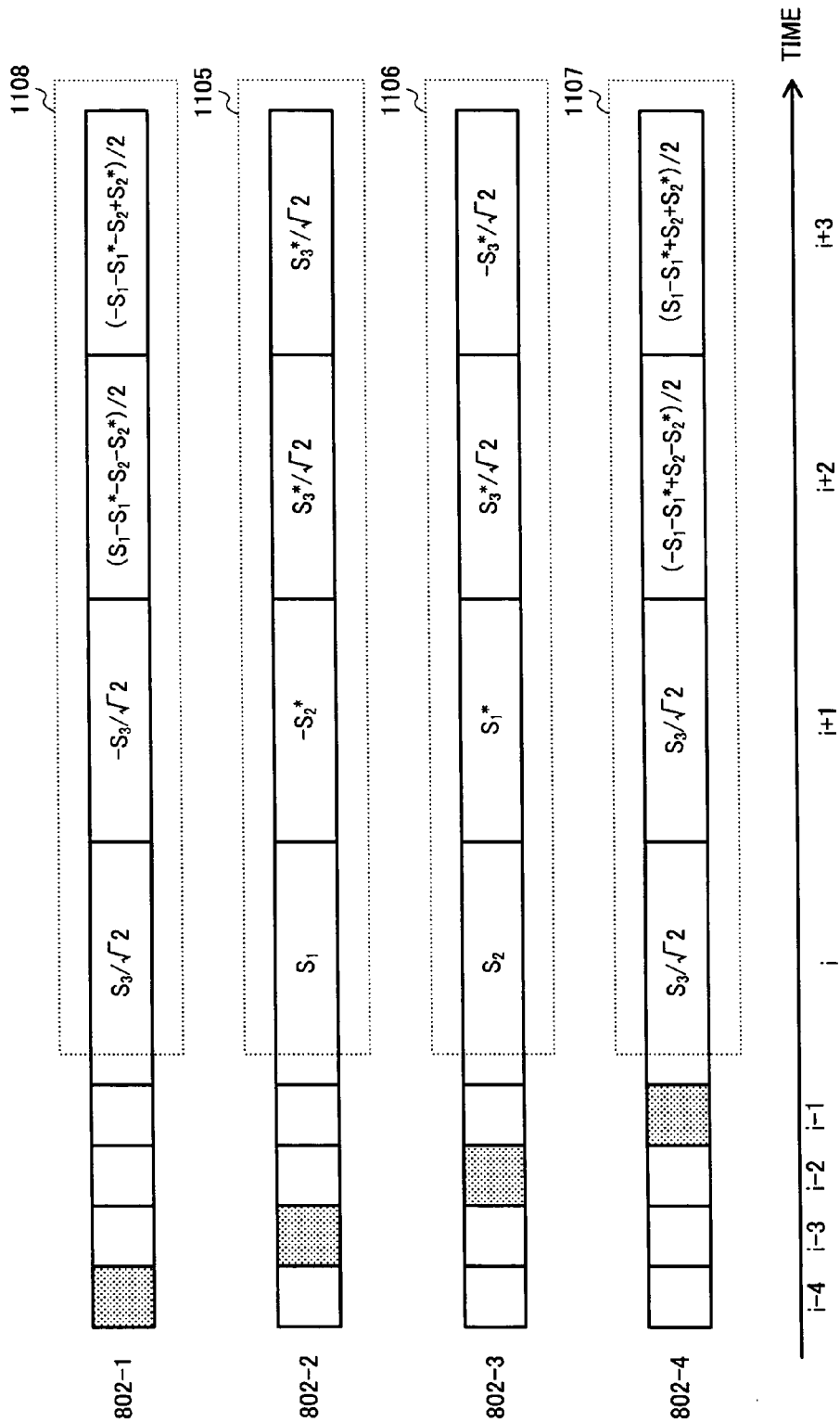
FIG. 14 is a drawing showing an example of a transmit frame configuration according to the above embodiment.

FIG. 14 is a drawing showing a transmit frame configuration when the transmit signal row vectors assigned to antennas 802-1 through 802-4 are changed around with respect to the transmit frame configuration shown in FIG. 12, so that transmit signal row vector 1108 is transmitted by antenna 802-1, transmit signal row vector 1105 is transmitted by antenna 802-2, transmit signal row vector 1106 is transmitted by antenna 802-3, and transmit signal row vector 1107 is transmitted by antenna 802-4.

Here, in transmitting apparatus 801, even if the transmit frame configuration is changed from that in FIG. 12 to that in FIG. 13 or FIG. 14, by having frame configuration signal generation section 904 of transmitting apparatus 801 and frame configuration signal storage section 1005 of receiving apparatus 851 use the same signal arrangement pattern, maximal-ratio combining of the transmit signals can be performed, large diversity gain obtained, and reception quality improved in receiving apparatus 851 after the changes in FIG. 13 or FIG. 14 in the same way as in the case of FIG. 12.

If a transmit frame configuration is erroneously demodulated on the receiving side (for example, if a transmit signal transmitted using a FIG. 13 frame configuration is erroneously demodulated as a FIG. 12 frame configuration), the orthogonality of the transmit signal matrix will be lost, and reception quality will degrade significantly. Considering this from the standpoint of secure communication, there is a large difference in reception quality between an intended recipient (a recipient who knows the correct transmit frame configuration) and an intercepting party (a recipient who does not know the correct transmit frame configuration), and highly secure communication is possible.

Transmit symbols (16 in FIG. 12) making up a transmit signal matrix (such as 1110 in FIG. 12) that forms space-time block codes are not restricted as to their placement positions in that transmit signal matrix, and can be assigned arbitrary within a two-dimensional matrix (time direction/antenna direction). Regarding the number of patterns at this time, a symbol P is used that indicates the number of patterns when k items out of n items are aligned, and there are nPk ways (in the case of FIG. 16, 16P16 (16×15× . . . ×2×1) ways). Unlike a one-dimensional matrix such as an M matrix used as a spreading code in spread spectrum communication, an extremely large number of patterns can be used, making highly secure communication possible. Also, as shown in this embodiment, when space-time block codes are used, a further advantage is that secure communication is possible without lowering the transfer rate.

Figure 15:
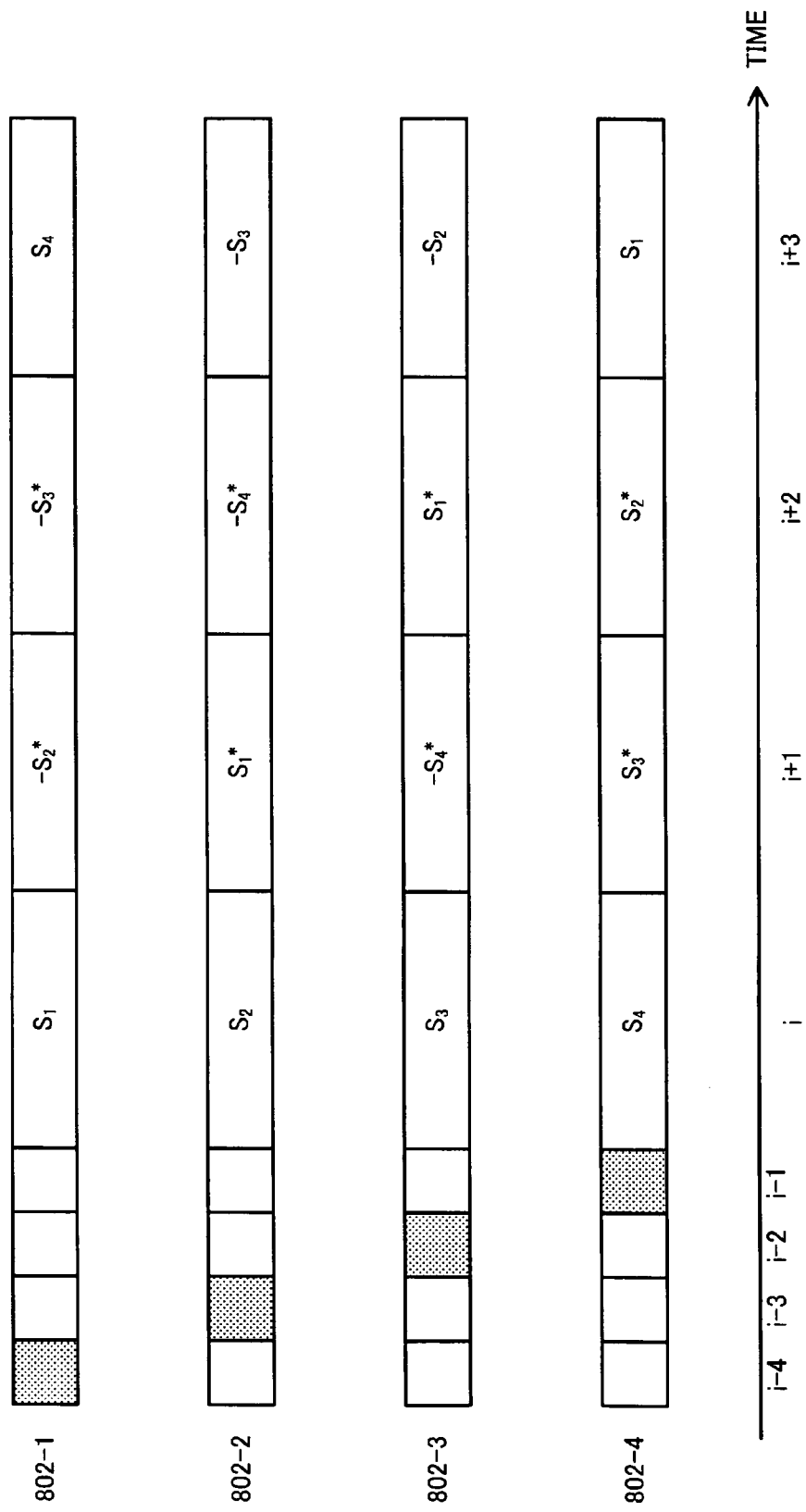
FIG. 15 is a drawing showing an example of a transmit frame configuration according to the above embodiment.

The space-time block coding method is not limited to that described above, and methods include that shown in "A Quasi-orthogonal Space-Time Block Code" IEEE TRANSACTIONS ON COMMUNICATIONS, pp 1-4, vol.49, no.1, JANUARY 2001, for example. This method is referred to as a quasi-orthogonal space-time block coding method, and an example of a transmit frame configuration when this method is used is shown in FIG. 15. With this method, the transmit signal column vectors of a transmit signal matrix are configured as partially orthogonal (and the same applies to the row vectors), and separation cannot be performed on a symbol-by-symbol basis on the receiving side, with the result that receiving-side processing is more complicated, and diversity gain smaller, than in the case of the orthogonal space-time block coding shown in previously cited "Space-Time Block Coding for Wireless Communications: Performance Results" IEEE JOURNAL ON SELECTED AREAS IN COMMUNICATIONS, pp 451-460, vol.17, no.3, March 1999 (FIG. 12, etc.). However, an advantage of quasi-orthogonal space-time block coding is that a higher transfer rate is possible than with orthogonal space-time block coding. This use of a space-time block code different from an orthogonal space-time block code, such as the above-described quasi-orthogonal space-time block code, increases the code selection patterns and makes more highly secure communication possible.

In the above description, a secure communication method that uses a transmit signal matrix has been described. Below, a secure communication method that uses pilot symbols will be described.

Figure 16:
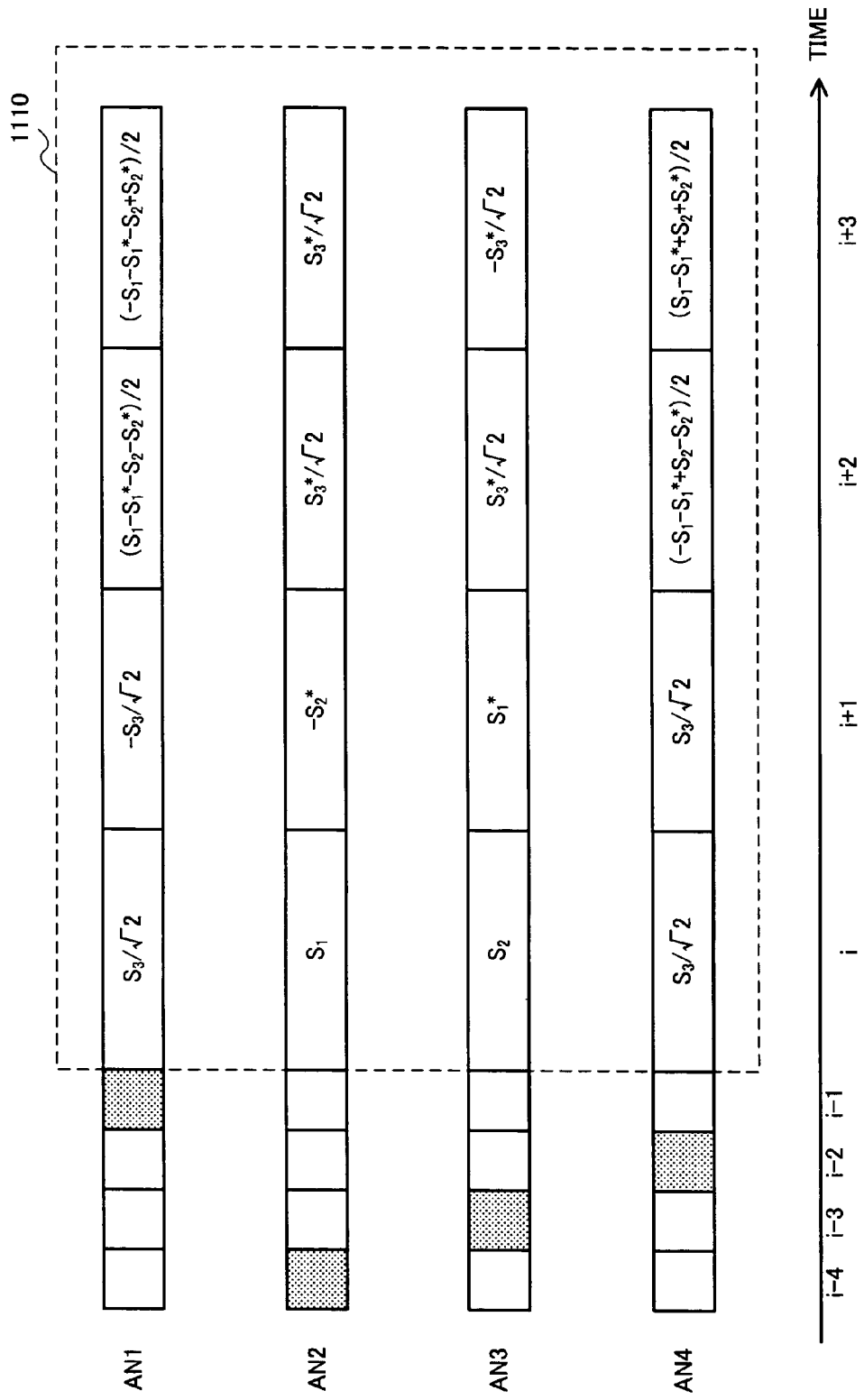
FIG. 16 is a drawing showing an example of a transmit frame configuration according to the above embodiment.

FIG. 16 is a drawing showing a configuration in which the pilot symbol configuration has been changed with respect to the transmit frame configuration in FIG. 12. When this configuration is used, also, if this pilot symbol configuration is shared by transmitting apparatus 801 and receiving apparatus 851 in advance, it is possible to perform estimation of channel fluctuations h1, h2, h3, and h4 and demodulate transmit symbols S1, S2, and S3. However, a receiving apparatus that cannot share the pilot symbol configuration shown in FIG. 16 with transmitting apparatus 801, while able to perform pilot symbol estimation, does not know which of those estimates apply to which of channel fluctuations h1, h2, h3, and h4. It is therefore difficult for such a receiving apparatus to demodulate transmit symbols correctly. Assignment of these pilot symbols in the time direction and antenna direction can also be thought of as assignment within a two-dimensional matrix, and since many patterns can be used, highly secure communication is possible. Also, when space-time block coded symbols are used as pilot symbols, channel fluctuation estimation can be performed with a high degree of precision, and highly secure communication is possible.

Figure 17:
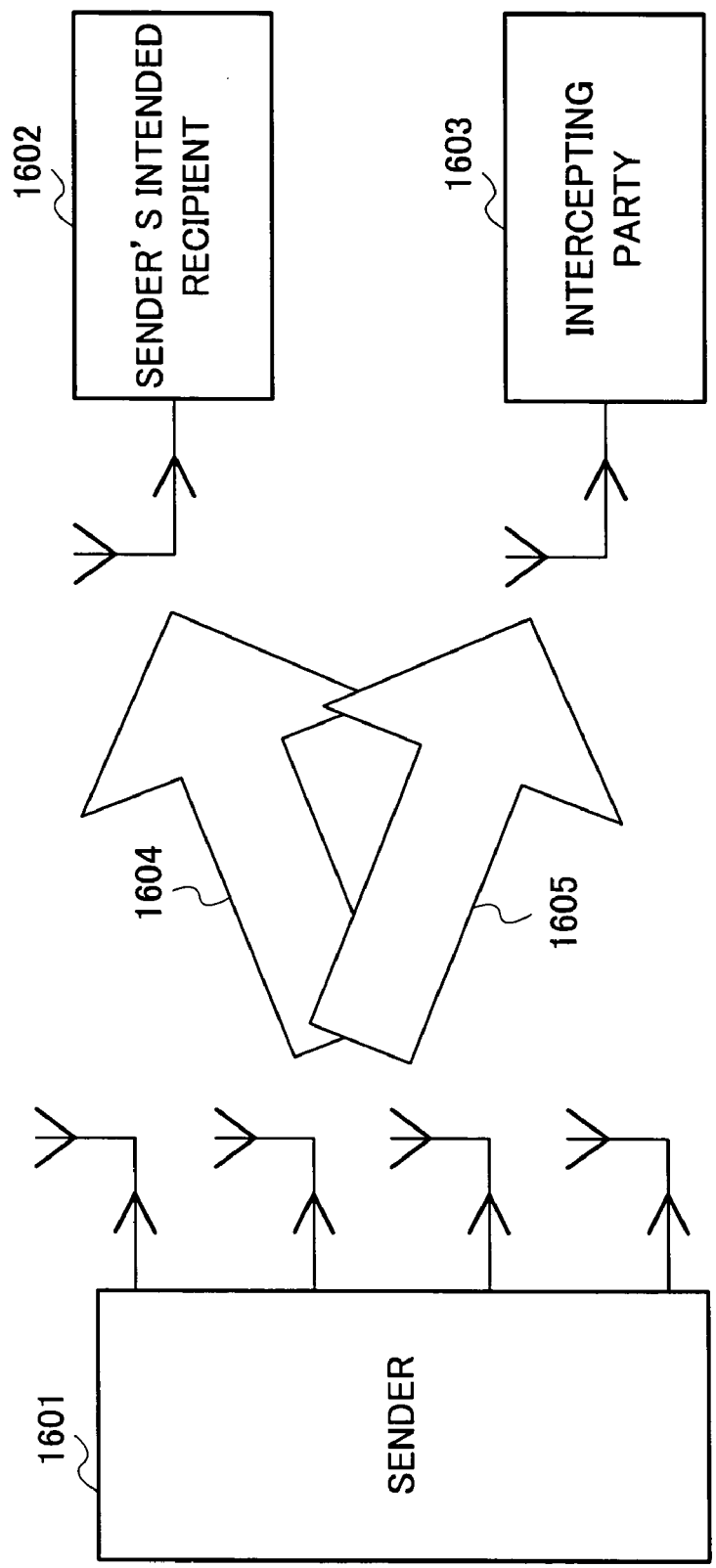
FIG. 17 is a drawing explaining a sample implementation of a system that uses a secure communication method according to the above embodiment.

A sample implementation of a system that uses a secure communication method of this embodiment is described below using FIG. 17. FIG. 17 shows a sender 1601 capable of communicating using the secure communication method shown in this embodiment, an intended recipient 1602 with whom sender 1601 wishes to communicate, and an intercepting party 1603 attempting to intercept communications between sender 1601 and intended recipient 1602.

Channel fluctuation 1604 between sender 1601 and intended recipient 1602 is assumed to be shared between these two parties (for example, in the case of a TDD (Time Division Duplex) system that uses the same frequency for the uplink and downlink, sharing is possible since channel fluctuation can be regarded as identical for the uplink and downlink).

At this time, based on channel fluctuation 1604, sender 1601 transmits while controlling the transmit power so as to result in the minimum necessary CNR (Carrier-to-Noise Ratio) for intended recipient 1602. By this means, intended recipient 1602 is able to obtain the necessary data. However, even if channel fluctuation 1605 between sender 1601 and intercepting party 1603 is a value that can be regarded as the same as channel fluctuation 1604, intercepting party 1603 cannot demodulate the space-time block code correctly without knowing the transmit frame configuration, and therefore suffers greatly degraded reception quality, and has extreme difficulty in decoding the data that intended recipient 1602 needs.

As explained above, using a system of this embodiment makes possible highly secure communication between the intended parties. At this time, the present invention can be similarly implemented if a configuration is used whereby intended recipient 1602 transmits an RSSI (Received Signal Strength Indicator) value, for example, to sender 1601 as a value indicating reception quality.

The above-described embodiments are also effective with UWB (Ultra Wide Band) communication. When UWB communication is performed in these embodiments, configurations are used in which the radio sections are omitted from transmitting apparatus 801 in FIG. 10 and receiving apparatus 851 in FIG. 11. In UWB communication, transmission and reception is performed by spreading a signal over an extremely wide frequency band of around 1 GHz, and signals transmitted in the respective frequency bands have power of the level of noise. Therefore, unless an intercepting party shares the pattern with the transmitter, only extremely low power can be used, and interception is extremely difficult. Also, the fact that the size relationship of the received signal power from each antenna is also low is another point facilitating the execution of secure communication of this embodiment.

In the above embodiments, the descriptions have assumed that the antenna change pattern, space-time block coding transmission row vector change pattern, and so forth, are shared in advance, but the probability of interception can also be lowered in a case where an intercepting party demodulates all patterns on a round-robin basis by making a pattern change based on an RSSI value, for example. By making this pattern change, secure communication of this embodiment is made more highly secure. In this case, in transmitting apparatus 801, the signal arrangement pattern is changed by inputting signal arrangement pattern information to frame configuration signal generation section 904. In receiving apparatus 851, a received baseband signal is input to frame configuration signal storage section 1005 and the signal point arrangement is changed, and demodulated transmission symbols are obtained using a frame configuration signal and timing information.

By transmitting information that is not wished to be, or must not be, divulged to any but the intended communicating party on any account—such as the aforementioned antenna change pattern, the aforementioned space-time block coding transmission row vector change pattern, an encryption key in communication in which encryption is performed, and so forth—using the secure communication method described in this embodiment, and transmitting other data without performing the secure communication of this embodiment, highly secure communication is made possible while keeping degradation of data transmission efficiency small.

Figure 18:
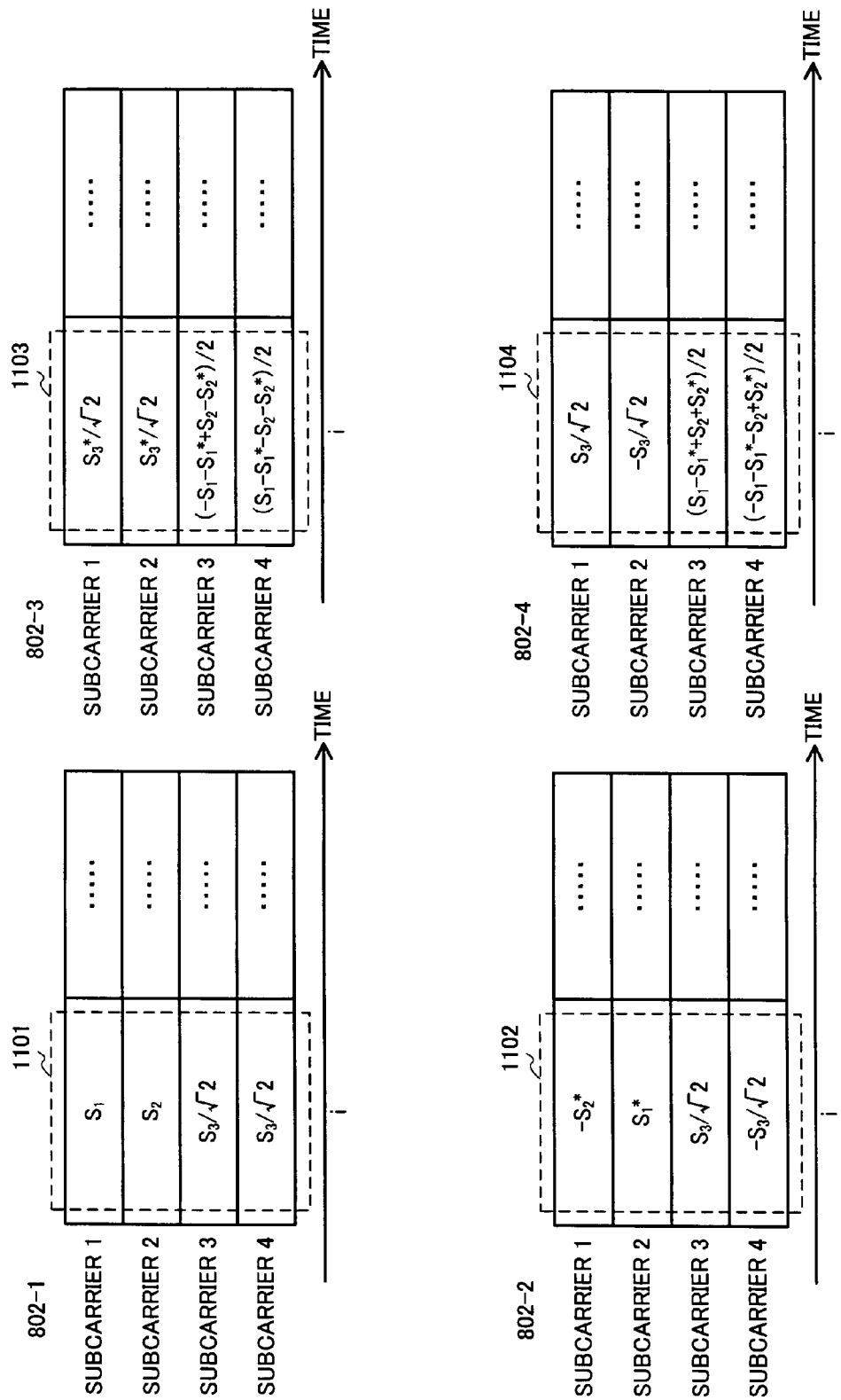
FIG. 18 is a drawing showing an example of assignment in the frequency direction of space-time block coded transmit symbols according to the above embodiment.

In the method shown in this embodiment, space-time block coded transmit symbols are assigned in the time direction and antenna direction by rearranging the transmit signal row vectors or column vectors, but this embodiment is not limited to this assignment method, and can be similarly implemented by spreading and assigning space-time block coded transmit symbols so as to be randomly interleaved. It is also possible for assignment to be performed in the frequency direction. FIG. 18 is a drawing showing an example of assignment of space-time block coded transmit symbols in the frequency direction, illustrating a case in which transmission is performed using OFDM (Orthogonal Frequency Division Multiplexing) modulation. The basic transmitter and receiver configurations when using OFDM modulation are as shown in FIG. 2 and FIG. 3, and are therefore not described in detail here. A system using OFDM modulation is configured by omitting the spreading sections in FIG. 10 and inserting S/P sections and IFFT sections, and omitting the despreading sections in FIG. 11 and inserting P/S sections and FFT sections.

FIG. 18 is a drawing showing an example of the transmit frame configuration when an OFDM modulated signal (using four subcarriers) is transmitted from transmitting apparatus 801 shown in FIG. 9. Transmit signal column vector 1101 allocated to antennas 802-1 through 802-4 in FIG. 12 is arranged in subcarriers 1 through 4 of the OFDM modulated signal transmitted by antenna 802-1, and similarly, transmit signal column vectors 1102, 1103, and 1104 are arranged in the subcarriers of the OFDM modulated signals transmitted by antenna 802-2, 802-3, and 802-4, respectively. When using an OFDM modulated signal with this kind of arrangement, arrangement is possible in the time direction and frequency direction within the OFDM modulated signal (although only arrangement in the frequency direction is shown in FIG. 18, it is clear that arrangement can also be performed in the time direction), and a transmit frame configuration using a three-dimensional matrix is possible by adding antenna direction assignment to these two, enabling more patterns to be used than in the case of a one-dimensional matrix or two-dimensional matrix configuration. Thus, more highly secure communication is possible.

In the above description the number of subcarriers has been assumed to be four, but this is just one example, and in general, communication can be made more secure the greater the number of subcarriers used. The same also applies to the number of antennas, with the present invention not being limited to four transmitting antennas and one receiving antenna, but able to be similarly implemented using, for example, two transmitting antennas and two receiving antennas. As the reception quality can be improved by maximal-ratio combining of the transmit symbols demodulated via the two receiving antennas, the difference in reception quality between the intended recipient and an intercepting party is increased, and more highly secure communication can be performed.

In this embodiment, when spreading is not performed, configurations are used in which the spreading sections in FIG. 10 and the despreading sections in FIG. 11 are omitted.

OTHER EMBODIMENTS

A home network system will now be described as an example of the use of a system of the present invention.

In recent years, digital playback and recording apparatuses using a hard disk (HD), DVD-ROM, or the like as a storage medium have become increasingly popular. A digital playback and recording apparatus does not suffer from deterioration of information, and can implement functions that are difficult or impossible with a conventional VCR, such as fast skipping to a particular playback point, and allowing a user to temporarily halt a program being broadcast and then continue viewing several minutes later. In addition, connection to the Internet allows digital playback and recording apparatus operations to be carried out via a network, including downloading of the latest EPG (Electronic Program Guide) and operating the apparatus from outside the home.

Figure 19:
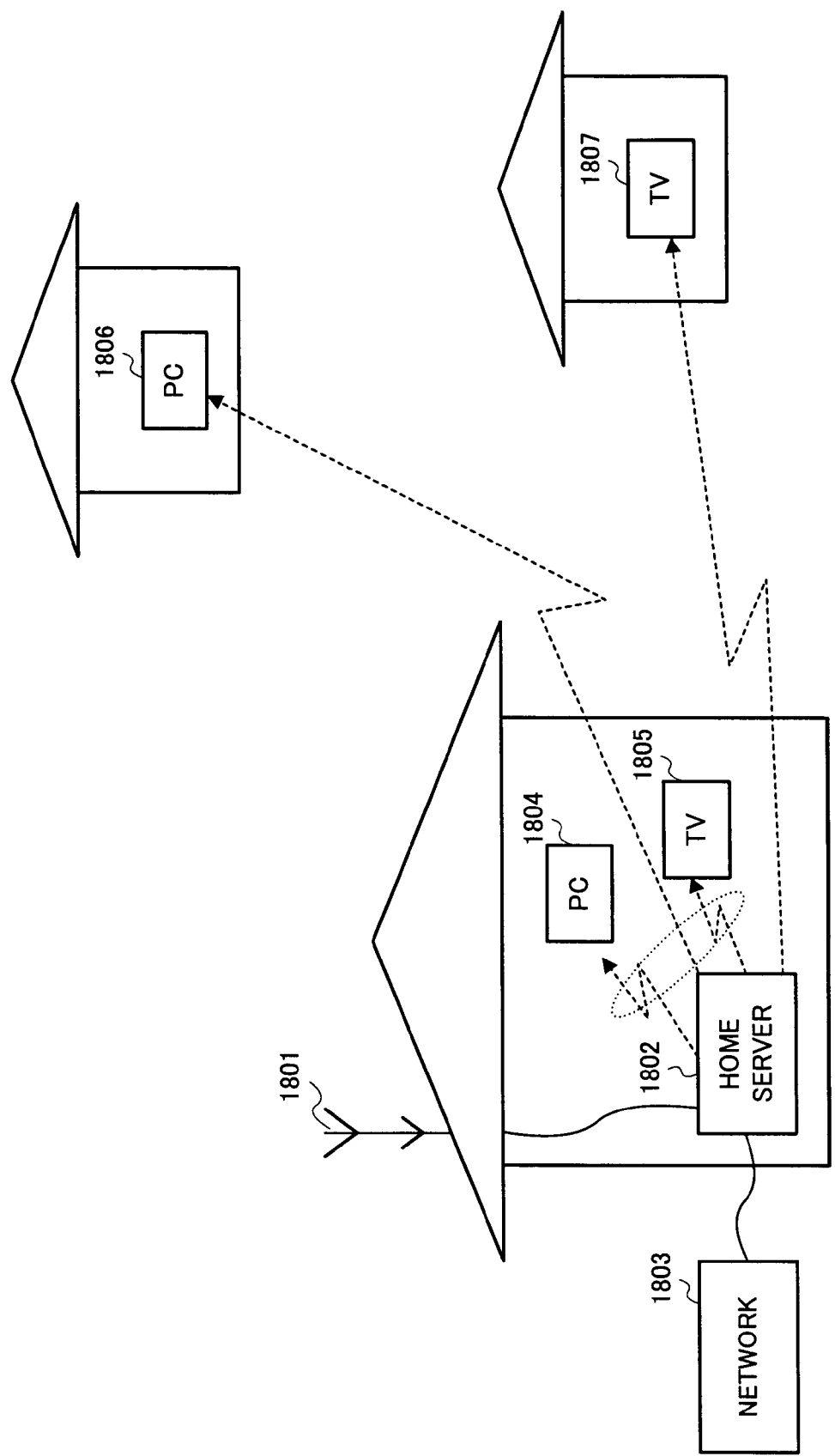
FIG. 19 is a drawing showing a home network system to which the present invention can be applied.

At the same time, ADSL, FTTH, and suchlike broadband circuits are becoming increasingly widely used for wireless LAN systems in the home. Furthermore, home network systems that transmit television and video images within the home using a wireless system are also starting to become popular. An example of such a system is shown in FIG. 19. A received signal received by a receiving antenna 1801 is stored in a home server 1802. Also, a received signal distributed from a network 1803 by means of TCP/IP transmission or the like via an ADSL, FTTH, or similar broadband circuit is stored in home server 1802. Here, home server 1802 includes a digital playback and recording apparatus with a hard disk or the like as a storage medium.

Home server 1802 performs signal processing of a received signal received from receiving antenna 1801 or network 1803, storage medium video, voice, data, and so forth, and performs radio transmission thereof to a PC (Personal Computer) 1804 and TV (Television) 1805 in the home. PC 1804 and TV 1805 each have a receiving antenna, receive a signal transmitted from home server 1802, and obtain and display or play video, voice, and/or data. This kind of wireless system offers such advantages as the ability to use PCs and TVs at various locations in the home and the fact that troublesome wiring is unnecessary, and is expected to become increasingly popular in the future.

In comparison with a system that uses a single antenna for transmission and reception, a system that transmits and receives a plurality of signals using a plurality of antennas such as the system of the present invention theoretically enables channel capacity to be increased in the same frequency band, and has been the subject of a great deal of research. Increased channel capacity is extremely useful in an above-described wireless system in which high-speed, large-volume transmission is performed.

In the above-described wireless system, radio waves are generally not only propagated to a person or object desiring reception, but also to surrounding persons and objects. In the case shown in FIG. 19, for example, a transmit signal transmitted to PC 1804 and TV 1805 of a certain household from home server 1802 also reaches a PC 1806 and TV 1807 of neighboring households. In this case, the transmit signal from the home server may cause interference in PC 1806 and TV 1807, and the transmit signal from the home server may also be intercepted intentionally. When a signal is intercepted intentionally, in particular, various problems can be envisaged, such as a privacy problem of knowing which program is being viewed in the case of a broadcast signal, a problem of a person with no contract being able to receive a fee-paying broadcast free-of-charge, and a problem of digital content being reused.

With regard to intentional interception, the fragility of security in current wireless LAN systems is one well-known and serious problem. Although access control is implemented by means of an ID or password when an access point such as a wireless LAN modem is accessed in a wireless LAN system, many cases have been reported of an ID being easily guessed or a password being cracked within a few days or so, and similar problems may also occur when access control is implemented by means of IDs, passwords, or the like in a system that uses a plurality of transmitting and receiving antennas. A different kind of security implementation method from those used heretofore is thus desirable.

When a plurality of antennas are used, if those antennas are always the same the channel on which a signal is propagated cannot be switched, and therefore once a signal has been intercepted by a third party there is a possibility that interception will continue. However, if the transmitting antennas are switched, the channel on which a signal is propagated will also be different after the switchover, and security against transmit signal interception can be improved by performing this switching continuously.

The present application is based on Japanese Patent Application No.2003-318809 filed on Sep. 10, 2003, and Japanese Patent Application No.2004-258919 filed on Sep. 6, 2004, the entire content of which is expressly incorporated herein by reference.

INDUSTRIAL APPLICABILITY

The present invention is suitable for use in a base station apparatus and communication terminal apparatus of a radio communication system in which secure communication is performed.

Figure 1:
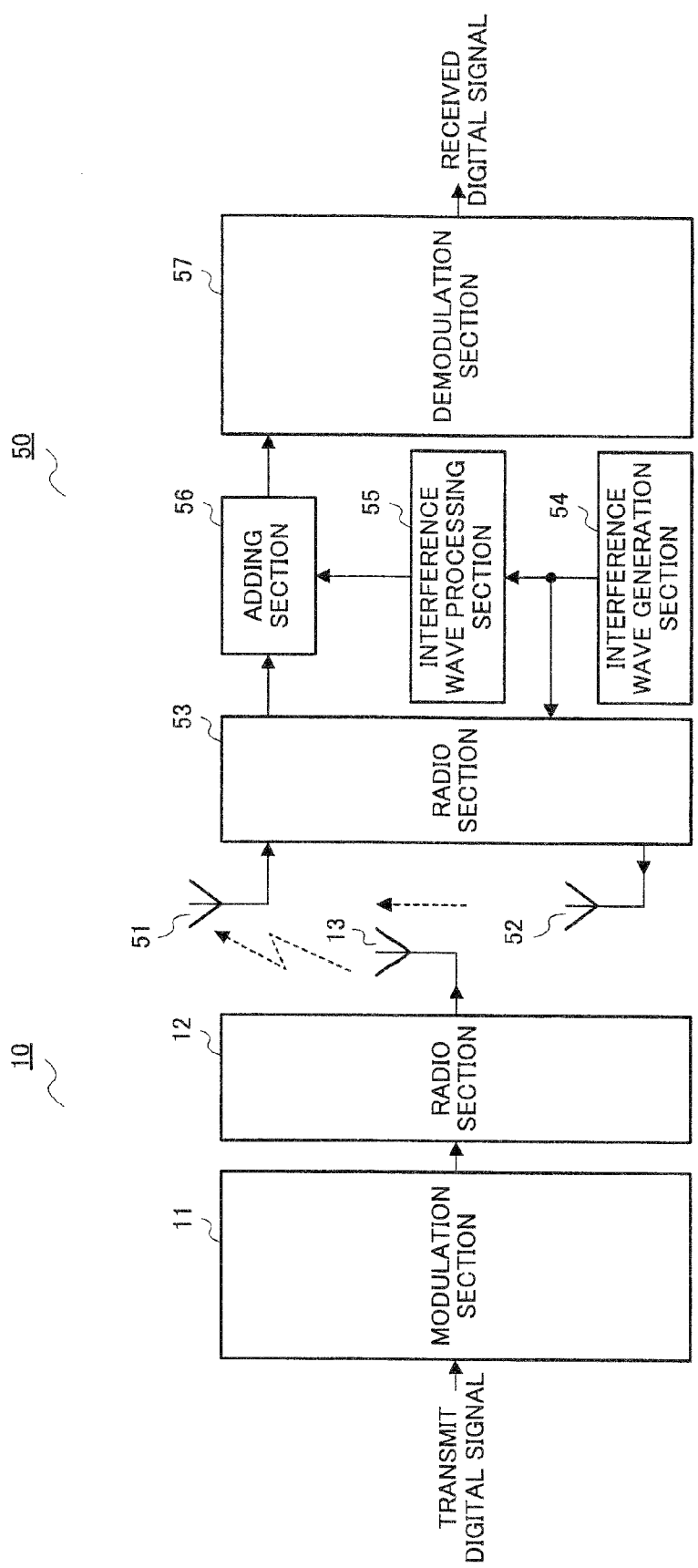
FIG. 1 is a drawing showing an example of a conventional secure communication method.

FIG.1
TRANSMIT DIGITAL SIGNAL
11 MODULATION SECTION
12 RADIO SECTION
53 RADIO SECTION
54 INTERFERENCE WAVE GENERATION SECTION
55 INTERFERENCE WAVE PROCESSING SECTION
56 ADDING SECTION
57 DEMODULATION SECTION
RECEIVED DIGITAL SIGNAL

FIG.2
TRANSMIT DIGITAL DATA
TRANSMIT DIGITAL DATA
101-1 FRAME CONFIGURATION SECTION
101-2 FRAME CONFIGURATION SECTION
102-1 S/P SECTION
102-2 S/P SECTION
103-1 IDFT SECTION
103-2 IDFT SECTION
104-1 RADIO SECTION
104-2 RADIO SECTION
105 ANTENNA CHANGING SECTION
CLOCK SIGNAL
106 ANTENNA SELECTION SECTION

FIG.3
202-1 RADIO SECTION
202-2 RADIO SECTION
203-1 DFT SECTION
203-2 DFT SECTION
204 PATTERN STORAGE SECTION
CLOCK SIGNAL
205-1 DATA SEPARATION SECTION
205-2 DATA SEPARATION SECTION
206-1 CHANNEL ESTIMATION SECTION
206-2 CHANNEL ESTIMATION SECTION
206-3 CHANNEL ESTIMATION SECTION
206-4 CHANNEL ESTIMATION SECTION
207 SIGNAL PROCESSING SECTION
RECEIVE DIGITAL DATA
RECEIVE DIGITAL DATA

FIG.4
TRANSMITTING ANTENNA 107-1
TRANSMITTING ANTENNA 107-2
TRANSMITTING ANTENNA 107-3
TRANSMITTING ANTENNA 107-1
TRANSMIT SIGNAL A
303 DATA SYMBOLS
TRANSMIT SIGNAL B
353 DATA SYMBOLS
TRANSMITTING ANTENNA 107-2
TRANSMITTING ANTENNA 107-3
TRANSMITTING ANTENNA 107-1
TRANSMITTING ANTENNA 107-2
TIME

FIG.5
ANTENNA CHANGE SIGNAL
TRANSMIT SIGNAL A
TRANSMIT SIGNAL B
ANTENNA SELECTION SECTION
RECEIVED SIGNAL
RECEIVED SIGNAL

Figure 6:
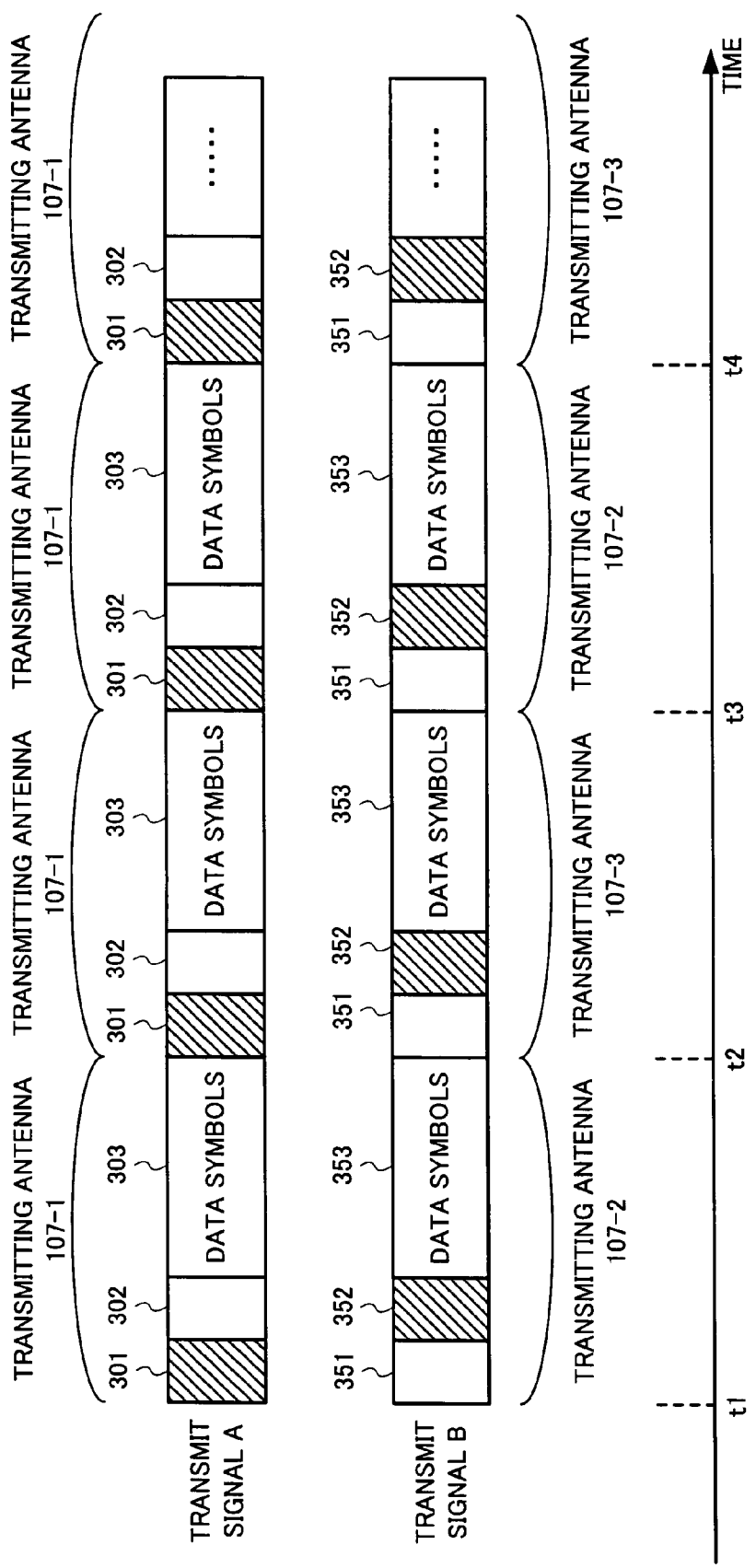
FIG. 6 is a drawing showing an example of frame configurations of transmit signals according to Embodiment 2 of the present invention.

FIG. 6
TRANSMITTING ANTENNA 107-1
TRANSMITTING ANTENNA 107-1
TRANSMITTING ANTENNA 107-1
TRANSMITTING ANTENNA 107-1
TRANSMIT SIGNAL A
303 DATA SYMBOLS
TRANSMIT SIGNAL B
353 DATA SYMBOLS
TRANSMITTING ANTENNA 107-2
TRANSMITTING ANTENNA 107-3
TRANSMITTING ANTENNA 107-2
TRANSMITTING ANTENNA 107-3
TIME

FIG.7
TRANSMITTING ANTENNA 107-1
TRANSMITTING ANTENNA 107-2
TRANSMITTING ANTENNA 107-3
TRANSMITTING ANTENNA 107-1
TRANSMIT SIGNAL A
303 DATA SYMBOLS
(ENCRYPTION PATTERN 1)
DATA SYMBOLS
(ENCRYPTION PATTERN 2)
TRANSMIT SIGNAL B
353 DATA SYMBOLS
(ENCRYPTION PATTERN 1)
DATA SYMBOLS
(ENCRYPTION PATTERN 2)
TRANSMITTING ANTENNA 107-2
TRANSMITTING ANTENNA 107-3
TRANSMITTING ANTENNA 107-1
TRANSMITTING ANTENNA 107-2
TIME

FIG.8
TRANSMITTING ANTENNA 107-1
TRANSMITTING ANTENNA 107-2
TRANSMITTING ANTENNA 107-3
TRANSMITTING ANTENNA 107-1
TRANSMIT SIGNAL A
303 DATA SYMBOLS
TRANSMIT SIGNAL B
353 DATA SYMBOLS
TRANSMITTING ANTENNA 107-2

TRANSMITTING ANTENNA 107-3
TRANSMITTING ANTENNA 107-1
TRANSMITTING ANTENNA 107-2
NUMBER OF PACKETS

FIG. 9
800 MULTI-ANTENNA COMMUNICATION SYSTEM
801 TRANSMITTING APPARATUS
851 RECEIVING APPARATUS

FIG. 10
TRANSMIT DATA
901 DATA SPLITTING SECTION
902-1 MODULATION SECTION
902-2 MODULATION SECTION
902-3 MODULATION SECTION
903 PILOT SIGNAL GENERATION SECTION
904 FRAME CONFIGURATION SIGNAL GENERATION SECTION
CLOCK SIGNAL
905 SIGNAL FORMING SECTION
906-1 SPREADING SECTION
907-1 RADIO SECTION

FIG. 11
1001 RADIO SECTION
1002 DESPREADING SECTION
1003-1 CHANNEL ESTIMATION SECTION
1004 SYNCHRONIZATION SECTION
1005 FRAME CONFIGURATION SIGNAL STORAGE SECTION
1006 DEMODULATION SECTION

FIG. 12
TIME

FIG. 17
1601 SENDER
1602 SENDER'S INTENDED RECIPIENT
1603 INTERCEPTING PARTY

FIG. 18
SUBCARRIER 1
SUBCARRIER 2
SUBCARRIER 3
SUBCARRIER 4
TIME

FIG. 19
1802 HOME SERVER
1803 NETWORK

The invention claimed is:

1. A transmission method of a transmitting apparatus having a plurality of modulation sections, a signal forming section, a transmitting section and a plurality of transmitting antennas, the method comprising:
modulating, in the plurality of modulation sections, different transmission data to generate modulation signals;
generating, in the signal forming section, encoded signals by orthogonalizing at least a part of the modulation signals;
adding, in the signal forming section, pilot signals of varying time-domain arrangements between communicating parties to the encoded signals to generate transmission signals; and
transmitting the transmission signals in the transmitting section from the plurality of transmitting antennas.

2. The transmission method according to claim 1, wherein the time-domain arrangements of the pilot signals are changed based on a communication state.

3. A transmission method of a transmitting apparatus having a plurality of modulation sections, a signal forming section, a transmitting section and a plurality of transmitting antennas, the method comprising:
modulating, in the plurality of modulation sections, different transmission data to generate modulation signals;
generating, in the signal forming section, encoded signals by orthogonalizing at least a part of the modulation signals;
generating, in the signal forming section, transmission signals by varying time-domain arrangements of the encoded signals between communicating parties to generate transmission signals; and
transmitting the transmission signals in the transmitting section from the plurality of transmitting antennas.

4. The transmission method according to claim 3, wherein the time-domain arrangements of the encoded signals are changed based on a communication state.

5. A transmitting apparatus having a plurality of transmitting antennas, the transmitting apparatus comprising:
a plurality of modulation sections that modulate different transmission data to generate modulation signals;
a signal forming section that generates encoded signals by orthogonalizing at least a part of the modulation signals and adds pilot signals of varying time-domain arrangements between communicating parties to the encoded signals to generate transmission signals; and
a transmitting section that transmits, from the plurality of transmitting antennas, the transmission signals outputted from the signal forming section.

6. The transmitting apparatus according to claim 5, wherein the signal forming section changes the time-domain arrangements of the pilot signals based on a communication state.

7. A transmitting apparatus having a plurality of transmitting antennas, the transmitting apparatus comprising:
a plurality of modulation sections that modulate different transmission data to generate modulation signals;
a signal forming section that generates encoded signals by orthogonalizing at least a part of the modulation signals and varies time-domain arrangements of the encoded signals between communicating parties to generate a plurality of transmission signals; and
a transmitting section that transmits the transmission signals outputted from the signal forming section from the plurality of transmitting antennas.

8. The transmitting apparatus according to claim 7, wherein the signal forming section changes the time-domain arrangements of the encoded signals based on a communication state.

* * * * *

UNITED STATES PATENT AND TRADEMARK OFFICE
CERTIFICATE OF CORRECTION

PATENT NO. : 7,646,822 B2
APPLICATION NO. : 10/570790
DATED : January 12, 2010
INVENTOR(S) : Kobayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 913 days.

Signed and Sealed this

Sixteenth Day of November, 2010

David J. Kappos
*Director of the United States Patent and Trademark Office*